US011381918B2

(12) United States Patent
Ko et al.

(10) Patent No.: US 11,381,918 B2
(45) Date of Patent: Jul. 5, 2022

(54) NANO MEMBRANE, METHOD OF MANUFACTURING NANO MEMBRANE, AND APPARATUS FOR SPEAKER AND MICROPHONE USING NANO MEMBRANE

(71) Applicant: UNIST(ULSAN NATIONAL INSTITUTE OF SCIENCE AND TECHNOLOGY), Ulsan (KR)

(72) Inventors: Hyunhyub Ko, Ulsan (KR); Saewon Kang, Ulsan (KR); Seungse Cho, Ulsan (KR)

(73) Assignee: UNIST(ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 70 days.

(21) Appl. No.: 16/918,961

(22) Filed: Jul. 1, 2020

(65) Prior Publication Data
US 2020/0336837 A1    Oct. 22, 2020

Related U.S. Application Data

(62) Division of application No. 16/190,857, filed on Nov. 14, 2018, now Pat. No. 11,140,487.

(30) Foreign Application Priority Data

Oct. 11, 2017  (KR) .......................... 10-2017-0131633
Sep. 18, 2018  (KR) .......................... 10-2018-0111329

(51) Int. Cl.
*H04R 7/06*    (2006.01)
*B29C 41/20*    (2006.01)
*H04R 29/00*    (2006.01)
*H04R 31/00*    (2006.01)
*H04R 1/22*    (2006.01)
*H04R 7/10*    (2006.01)
*B29C 65/00*    (2006.01)
(Continued)

(52) U.S. Cl.
CPC ............... *H04R 7/06* (2013.01); *B29C 41/20* (2013.01); *B29C 66/03* (2013.01); *C08J 7/02* (2013.01); *C23C 26/00* (2013.01); *H04R 1/22* (2013.01); *H04R 7/10* (2013.01); *H04R 29/001* (2013.01); *H04R 29/004* (2013.01); *H04R 31/003* (2013.01); *B29K 2705/00* (2013.01); *B29L 2031/755* (2013.01); *H04R 2307/025* (2013.01); *H04R 2307/027* (2013.01)

(58) Field of Classification Search
CPC .............................. C09C 1/3072; C01B 33/14
See application file for complete search history.

(56) References Cited

U.S. PATENT DOCUMENTS

2009/0052029 A1*  2/2009  Dai ..................... G02B 5/3008
                                                359/485.02
2013/0056244 A1*  3/2013  Srinivas ................... H05K 1/09
                                                174/250

OTHER PUBLICATIONS

Akihito Miyamoto et al.; "Inflammation-free, gas-permeable, lightweight, stretchable on-skin electronics with nanomeshes"; Nature Nanotechnology; Jul. 17, 2017; pp. 1-8; Macmillan Publishers Limited.

* cited by examiner

*Primary Examiner* — Alexandre F Ferre
(74) *Attorney, Agent, or Firm* — Studebaker & Brackett PC

(57) ABSTRACT

Disclosed herein is a nano membrane. The nano membrane includes an insulating layer having a thickness corresponding to a diameter of each of metal nanowires and configured to contain the metal nanowires therein, and the metal nanow- (Continued)

ires arranged to cross and having portions of side surfaces which protrude from one surface of the insulating layer.

8 Claims, 64 Drawing Sheets

(51) Int. Cl.
    *C08J 7/02*           (2006.01)
    *C23C 26/00*        (2006.01)
    *B29L 31/00*        (2006.01)
    *B29K 705/00*      (2006.01)

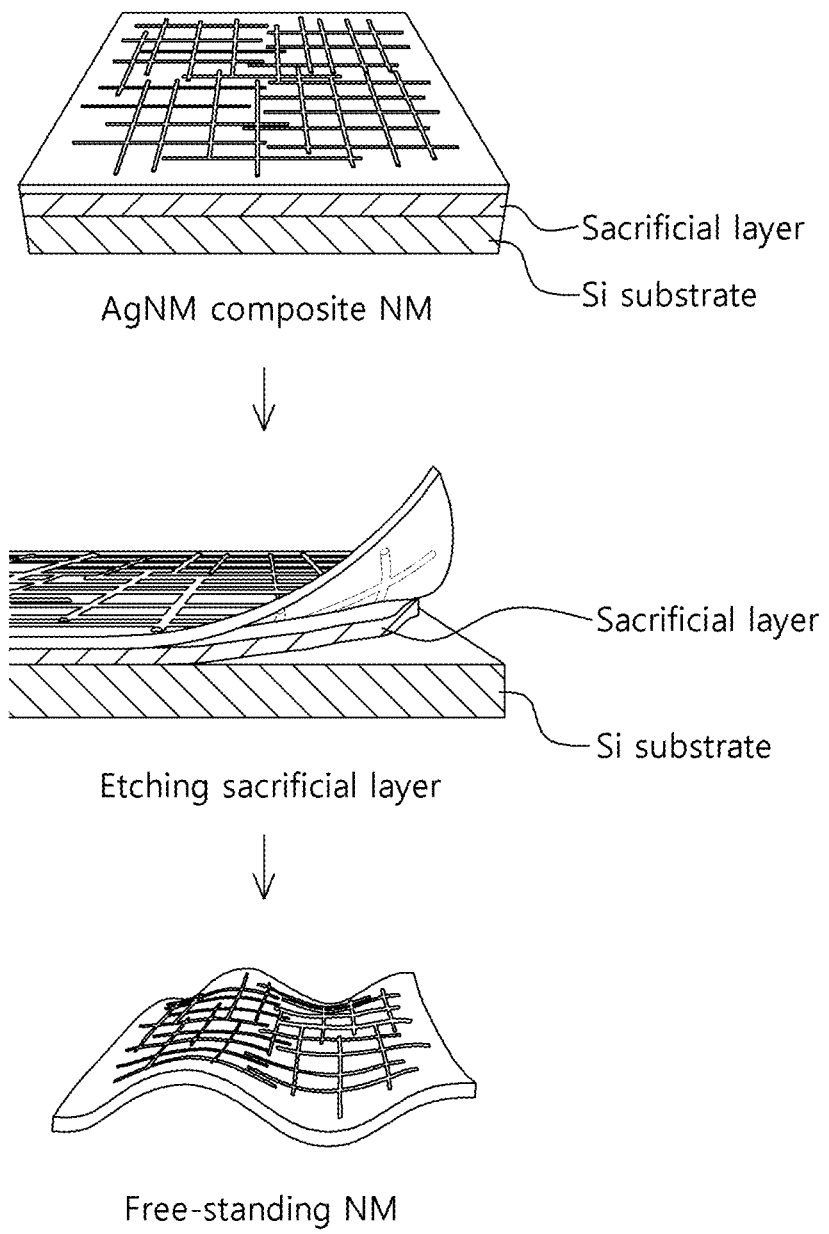

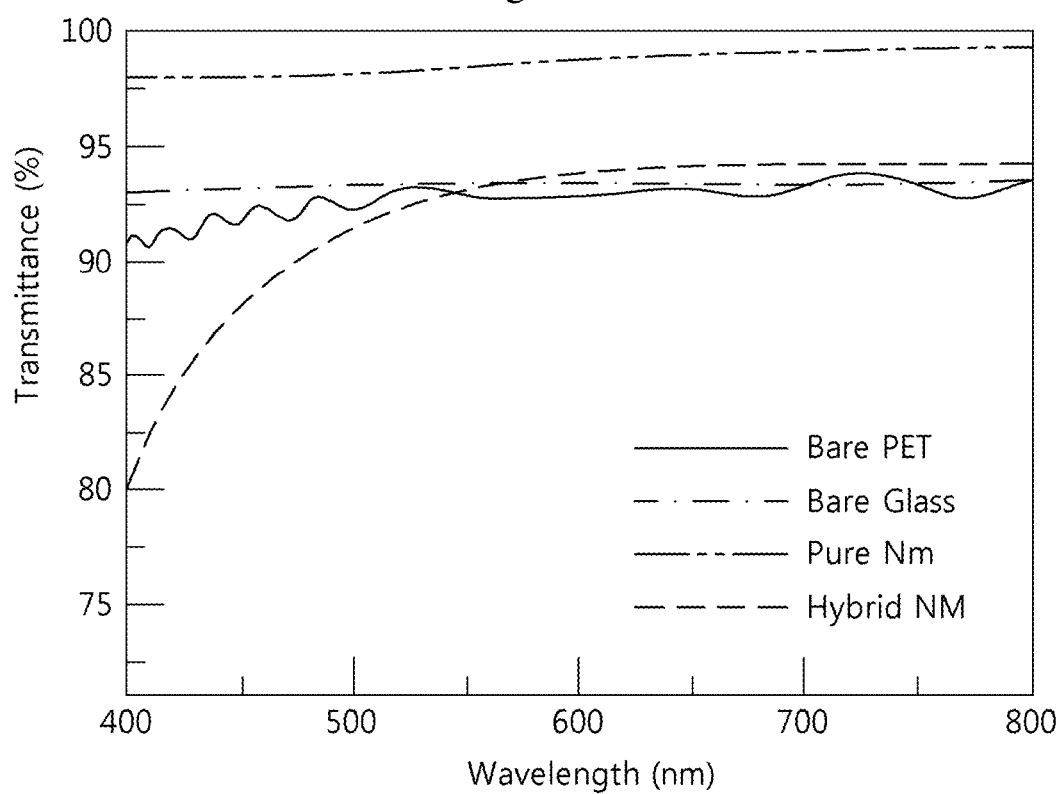

NANO MEMBRANE, METHOD OF MANUFACTURING NANO MEMBRANE, AND APPARATUS FOR SPEAKER AND MICROPHONE USING NANO MEMBRANE

CROSS-REFERENCE TO RELATED APPLICATION

This application is a divisional application of U.S. patent application Ser. No. 16/190,857 filed Nov. 14, 2018, which claims priority of Korean Patent Application Nos. 10-2017-0131633, filed on Oct. 11, 2017 and 10-2018-0111329, filed on Sep. 18, 2018, in the Korean Intellectual Property Office. The above-listed applications are incorporated herein by reference in their entirety.

BACKGROUND

1. Field of the Invention

The present invention relates to a conductive nano membrane based on a metal nanowire composite, a method of manufacturing the nano membrane, and a speaker and a microphone using the nano membrane.

2. Discussion of Related Art

With the rapid growth of "Internet of Things (IoT)," which interconnects humans and machines, personal electronic devices have evolved into smart, portable, and miniaturized devices. Nonetheless, such personal electronic devices still hinder tight integration with other electronic devices in the recent development of wearable devices.

For convenience and appearance, it is necessary to develop wearable electronic devices with light, versatile, transparent properties. This technological development can create new technologies such as invisible electronic devices, skin adhesive electronic skins (electronic skins), and conformal electronic devices.

Particularly, electronic devices using ultra-thin flexible substrates having thicknesses in the range of microns are capable of being in close contact with any surface and provide inconspicuous appearances. These electronic devices can be basically attached to skin and can also be directly attached to curved or uneven surfaces having complex topologies.

A free-standing nano membrane (Nano Membrane) having a nano-sized thickness can provide a robust platform for inconspicuous electronic devices which provide many features such as a light weight, excellent flexibility, optical transparency, and adaptability. This flexibility cannot be achieved with conventional bulk materials.

Conventionally, graphene-based conformal devices on micro-polymer nano membrane substrates have been developed for skin-mounted devices. $MoS_2$ semiconductor-based conformal tactile sensors have also been demonstrated with high optical transparency and high mechanical flexibility.

Although the nano membrane-based electronic devices exhibit extremely low bending stiffness to be capable of being in conformal contact with uneven surfaces, there is a problem in that mechanical properties of polymer nano membranes cause mechanical damage by external stress or deformation due to low fracture toughness.

Unlike polymer nano membranes, hybrid composite nano membranes may control types of loading materials such as metal nanoparticles, metal nanowires, carbon nanotubes, and graphene to provide various electrical, optical, and mechanical properties.

Particularly, since silver nanowires have high electrical, optical, and mechanical properties, the silver nanowires are suitable for hybrid nano membranes. Further, a conductive silver nanowire network can also be prepared with a cost-effective and large-scale solution-based process including spin coating, drop casting, rod coating, or spray coating.

Furthermore, in the past, there has been no attempt to develop a large-scale conductive silver nanowire composite nano membrane in an electronic device which can be attached to skin.

SUMMARY OF THE INVENTION

The present invention is directed to an ultra-thin, transparent, conductive, and robust silver nanowire composite nano membrane, which provides an inconspicuous appearance through excellent transparency and conformal surface contact ability and is capable of being in contact with a human body, a speaker and a microphone using the nano membrane, and a method of manufacturing the nano membrane.

According to an aspect of the present invention, there is provided a nano membrane including an insulating layer formed to have a predetermined thickness based on a diameter of each of the metal nanowires and contain metal nanowires therein, and the metal nanowires arranged to cross and having portions of side surfaces which protrude from one surface of the insulating layer.

The metal nanowires may be arranged such that the metal nanowires, of which a length direction is arranged in a second direction perpendicular to a first direction, are superimposed on the metal nanowires of which a length direction is arranged in the first direction.

The metal nanowires may be connected in a network structure.

According to another aspect of the present invention, there is provided a method of manufacturing a nano membrane, which includes forming a sacrificial layer on a substrate, coating the formed sacrificial layer with metal nanowires, depositing a polymer coating raw material on the sacrificial layer coated with the metal nanowires and forming an insulating layer, and removing the sacrificial layer.

The coating the formed sacrificial layer with the metal nanowires may include coating the sacrificial layer with the metal nanowires to direct a length direction of each of the metal nanowires in a first direction, and coating the sacrificial layer, which is coated with the metal nanowires, with the remaining metal nanowires to direct a length direction of each of the remaining metal nanowires in a second direction perpendicular to the first direction.

The forming of the insulating layer may include depositing the polymer coating raw material to have a predetermined thickness based on a diameter of each of the metal nanowires to include the metal nanowires in the deposited polymer coating raw material.

The metal nanowires may be included inside the insulating layer so that a part of a side surface of each of the metal nanowires protrudes from one surface of the insulating layer.

The removing of the sacrificial layer may include etching the sacrificial layer using a solution by which the sacrificial layer is dissolved.

According to still another aspect of the present invention, there is provided a speaker device using a nano membrane, which includes the above-described nano membrane, and a voltage portion configured to apply an alternating current (AC) voltage to the nano membrane.

The voltage portion may change a frequency of the AC voltage every predetermined period and apply the AC voltage of the changed frequency to the nano membrane.

The speaker device may further include a frequency measuring portion configured to measure a frequency of an input sound signal per time interval.

The voltage portion may change a frequency of the AC voltage to correspond to the measured frequency and apply the AC voltage of the changed frequency to the nano membrane.

According to yet another aspect of the present invention, there is provided a microphone device using a nano membrane, which includes the above-described nano membrane, a first polymer film bonded to an upper surface of the nano membrane, and a second polymer film bonded to a lower surface of the nano membrane.

The first polymer film may have a flat shape and include a hole passing through a flat surface.

The second polymer film may include a plurality of horns regularly arranged on a surface of the second polymer film, and vertexes of the horns may be in contact with the lower surface of the nano membrane.

The second polymer film may include a plurality of microdomes regularly arranged on a surface of the second polymer film, and the plurality of microdomes may be in contact with the lower surface of the nano membrane.

The second polymer film may include a plurality of micropillars regularly arranged on a surface of the second polymer film, and the plurality of micropillars may be in contact with the lower surface of the nano membrane.

The microphone device may further include a measuring portion configured to measure an output voltage of triboelectricity and a frequency, which are generated by vibration of the nano membrane when a sound pressure is applied to the microphone device.

BRIEF DESCRIPTION OF THE DRAWINGS

The accompanying drawings, which are included as a part of description to help understand the present invention, provide embodiments of the present invention and serve to describe the technical features thereof together with the description.

FIGS. 1A to 1I are diagrams illustrating a nano membrane according to one embodiment of the present invention.

DETAILED DESCRIPTION OF EXEMPLARY EMBODIMENTS

Figure 1B:
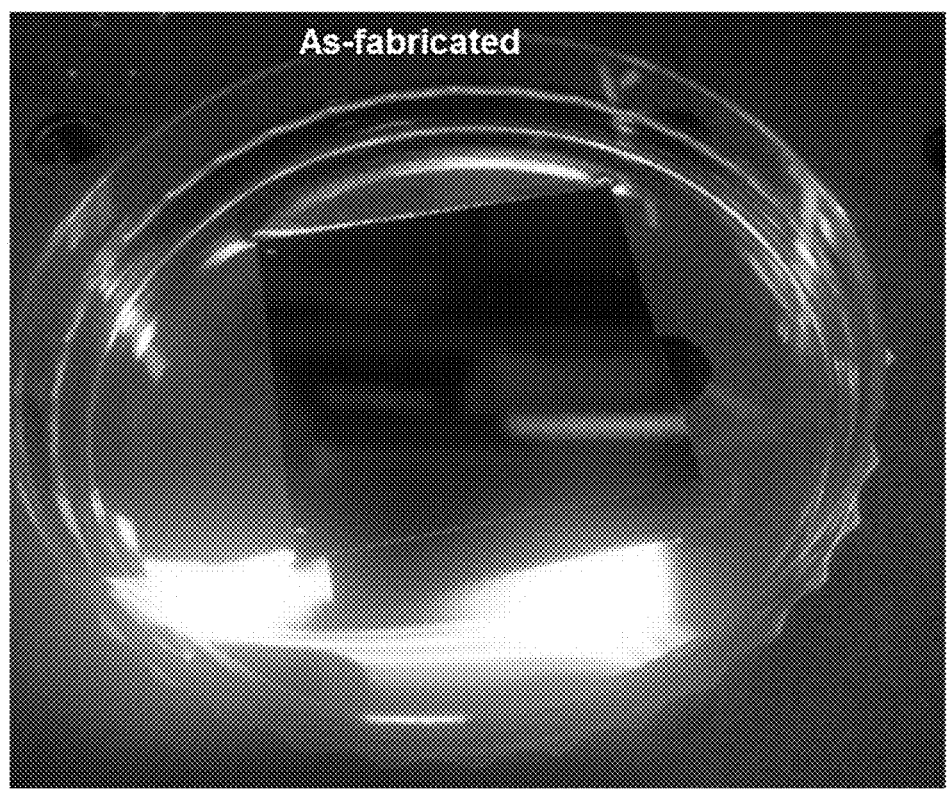

The terms a first, a second, and/or the like in this disclosure are used only for the purpose of distinguishing one component from another component. That is, components are not intended to be limited to these terms.

Components, features, and steps, which are referred to as "being included" in this disclosure, mean the presence of corresponding components, features, and steps and do not preclude the presence of one or more other components, features, steps, and equivalents thereof.

Unless the context clearly dictates otherwise, the singular form includes the plural form. That is, the components and the like referred to in this disclosure may mean the presence or addition of one or more other components or the like.

Unless defined otherwise, all terms including technical or scientific terms used herein have the same meaning as commonly understood by those skilled in the art (ordinary skilled persons) to which the present invention pertains.

That is, general terms that are defined in a dictionary shall be construed to have meanings that are consistent in the context of the relevant art, and will not be interpreted as having an idealistic or excessively formalistic meaning unless clearly defined in this disclosure.

Hereinafter, a nano membrane according to embodiments of the present invention, a method of manufacturing the nano membrane, and a speaker and microphone using the nano membrane will be described in detail with reference to the accompanying drawings.

FIGS. 1A to 1I are diagrams illustrating a nano membrane according to one embodiment of the present invention.

Specifically, FIG. 1A is a diagram illustrating a process of manufacturing the nano membrane according to one embodiment of the present invention.

The process of manufacturing a nano membrane according to one embodiment of the present invention may include forming a sacrificial layer on a substrate, coating the deposited sacrificial layer with metal nanowires, forming an insulating layer by depositing an insulating polymer coating raw material on the sacrificial layer coated with the metal nanowires, and removing the sacrificial layer.

The forming of the sacrificial layer on the substrate may include forming the sacrificial layer, which will be removed later, on the substrate, and for example, the sacrificial layer may be formed by depositing zinc oxide (ZnO) on a silicon (Si) substrate.

The coating of the deposited sacrificial layer with the metal nanowires includes coating the sacrificial layer with silver nanowires through solution-based bar-coating.

The coating of the deposited sacrificial layer with the metal nanowires includes coating the deposited sacrificial layer with the metal nanowires to direct a length direction of each thereof in a first direction and coating the sacrificial layer, which is coated with the metal nanowires, with the remaining metal nanowires to direct a length direction of each of the remaining metal nanowires in a second direction perpendicular to the first direction.

That is, the metal nanowires of which a length direction is arranged in the second direction may be superimposed on the metal nanowires of which a length direction is arranged in the first direction. The metal nanowires are arranged perpendicular to each other, and since the metal nanowires are coated with a network structure, each of the metal nanowires may be connected to each other.

The forming of the insulating layer by depositing the insulating polymer coating raw material on the sacrificial layer coated with the metal nanowires includes forming an insulating layer by depositing parylene-C, which is a polymer coating raw material, on the sacrificial layer coated with the metal nanowires.

The insulating layer may be formed to have a predetermined thickness based on a diameter of each of the metal nanowires. That is, since a height of a portion at which the metal nanowires intersect is higher than the diameter of each of the metal nanowires, the insulating layer may be formed to have a thickness in consideration of the height of the portion, at which the metal nanowires intersect, corresponding to the diameters of the metal nanowires.

For example, the insulating layer may be formed to have a thickness in the range of the height of the portion, at which the metal nanowires intersect, to 100 nm.

The metal nanowires may be included inside the insulating layer so that a portion of a side surface of each of the metal nanowires may protrude from one surface of the insulating layer.

The removing of the sacrificial layer includes etching the sacrificial layer using a solution by which the sacrificial layer is dissolved. For example, the sacrificial layer may be etched using a citric acid solution (10 wt % in water) to obtain a silver nanowire composite nano membrane (hereinafter referred to as a nano membrane) separated from the Si substrate.

Figure 1C:
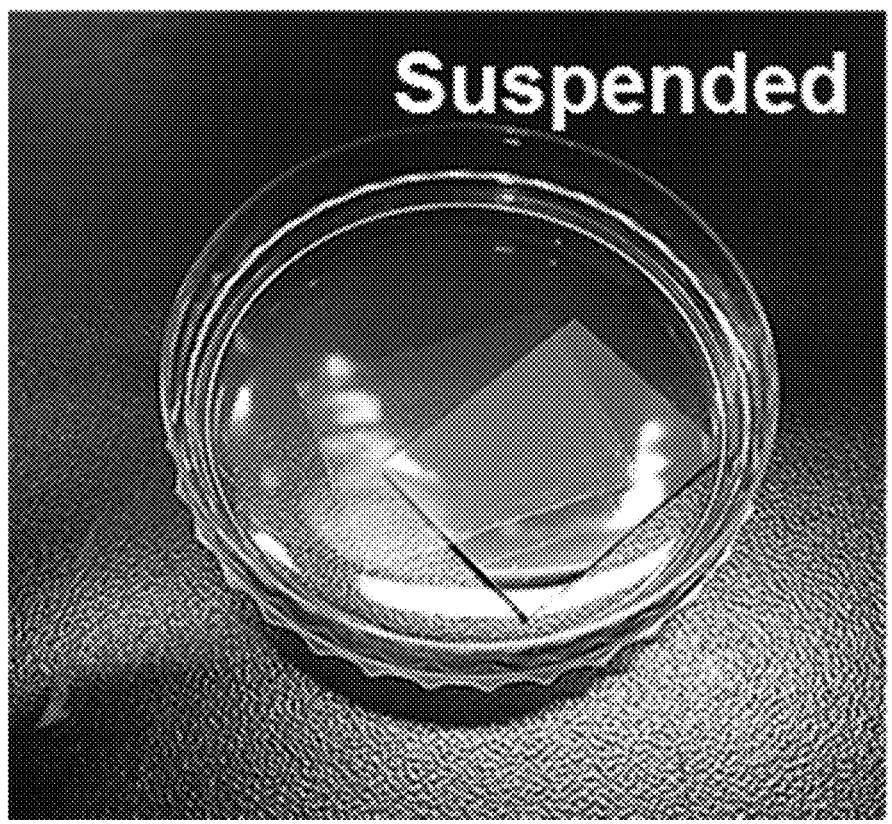

FIG. 1B is a photograph showing a nano membrane deposited on the sacrificial layer, and FIG. 1C is a photograph showing a nano membrane from which the sacrificial layer is etched.

The nano membrane deposited on the sacrificial layer is floated on the citric acid solution and the ZnO sacrificial layer is dissolved by the citric acid solution such that the Si substrate and the nano membrane may be separated.

Figure 1D:
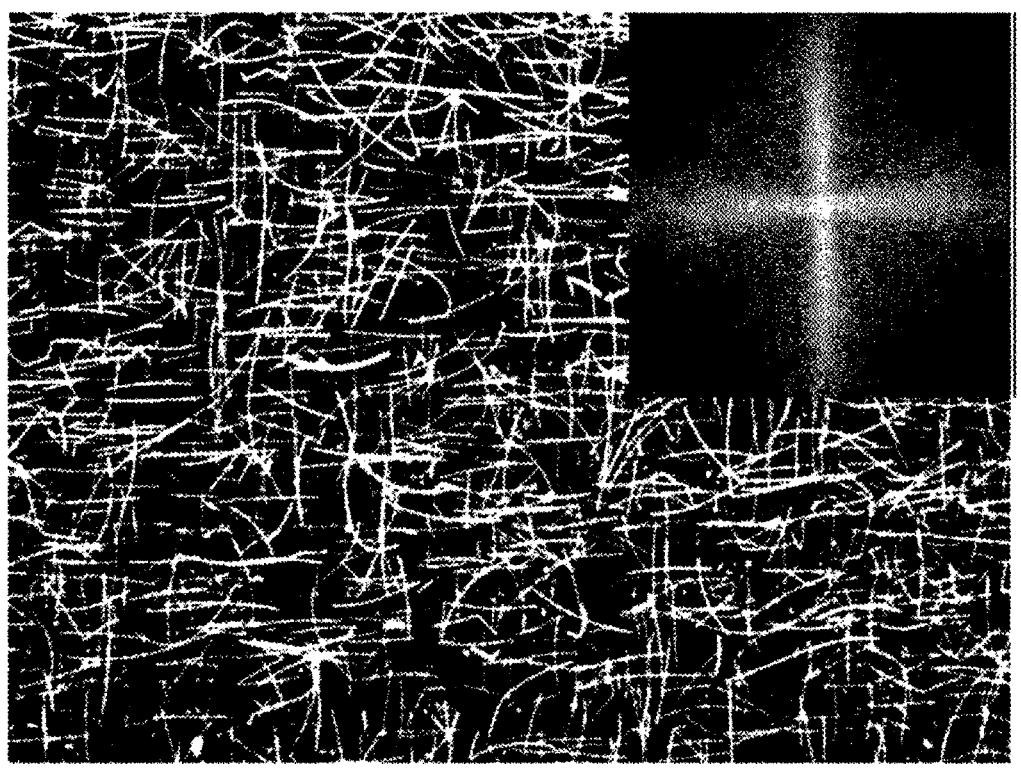

FIG. 1D is a photograph showing a dark field optical microscope image and a Fast Fourier Transform (FFT) image of a cross-aligned silver nanowire array. Referring to FIG. 1D, it can be seen that the silver nanowires are highly aligned with a cross structure.

Figure 1E:
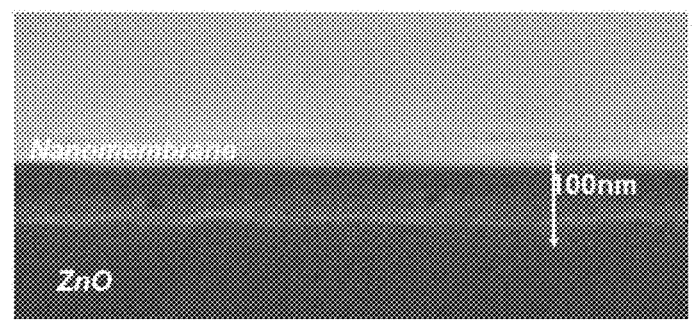

FIG. 1E is a cross-sectional scanning electron microscope (SEM) image of the nano membrane deposited on the sacrificial layer. Referring to FIG. 1E, a polymer coating raw material may be deposited with a thickness of 100 nm or less on the sacrificial layer.

FIG. 1F is a graph showing average optical transmittance of each of a conventional nano membrane, the nano membrane according to one embodiment of the present invention, polyethylene terephthalate (PET), and glass in a visible light wavelength range of 400 nm to 800 nm.

Referring to FIG. 1F, in the visible light wavelength range of 400 nm to 800 nm, the average optical transmittance of the conventional nano membrane (Pure NM) not containing silver nanowires is about 98.2%, the average optical transmittance of the PET is about 92.9%, and the average optical transmittance of the glass (Glass) is about 93.5%.

The average optical transmittance of the nano membrane (Hybrid NM) according to one embodiment of the present invention was measured to be higher than the average optical transmittances of the PET and the glass in the visible light wavelength range of 550 nm to 800 nm.

Figure 1G:
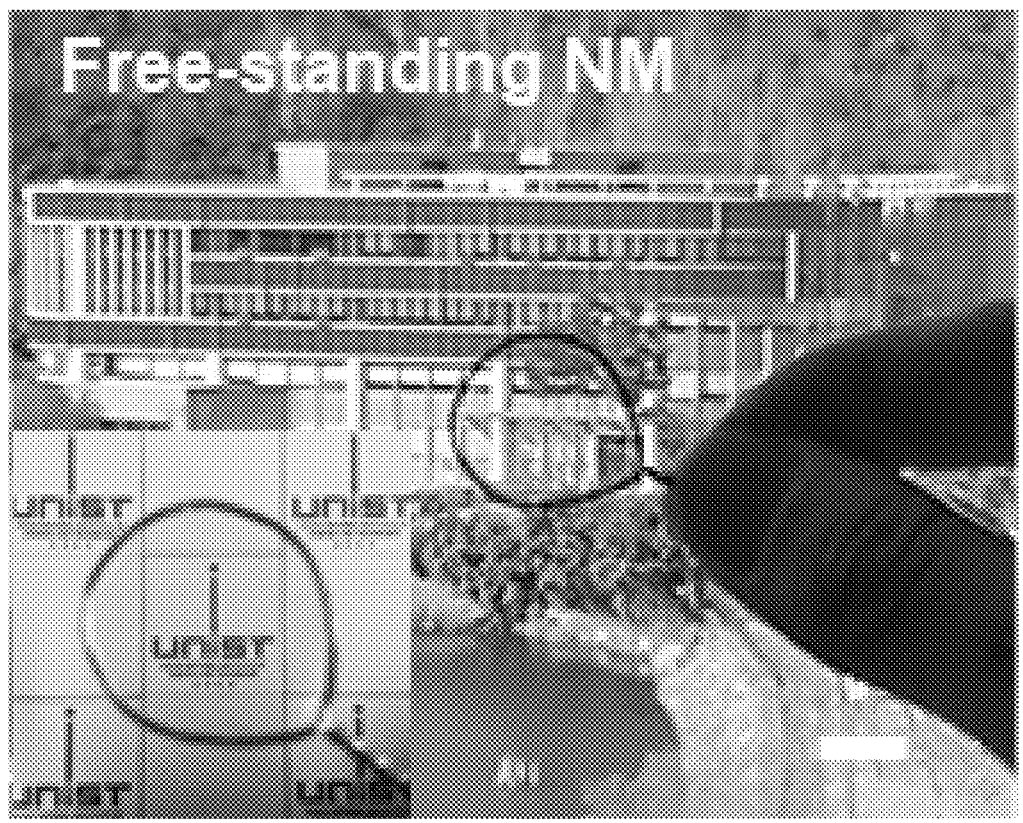

FIG. 1G is a photograph showing a nano membrane supported by a wire loop.

Referring to FIG. 1G, an inset is an enlarged view of a photograph captured through the nano membrane according to one embodiment of the present invention.

The nano membrane according to one embodiment of the present invention is optically transparent, and the silver nanowires are arranged orthogonally therein to provide high electrical conductivity.

Figure 1H:
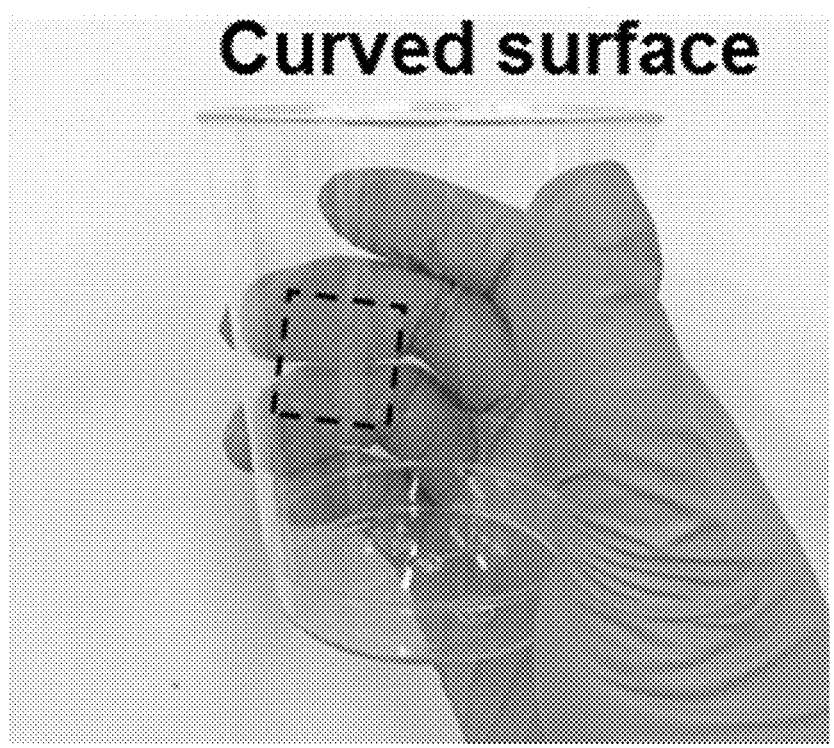
Figure 1I:
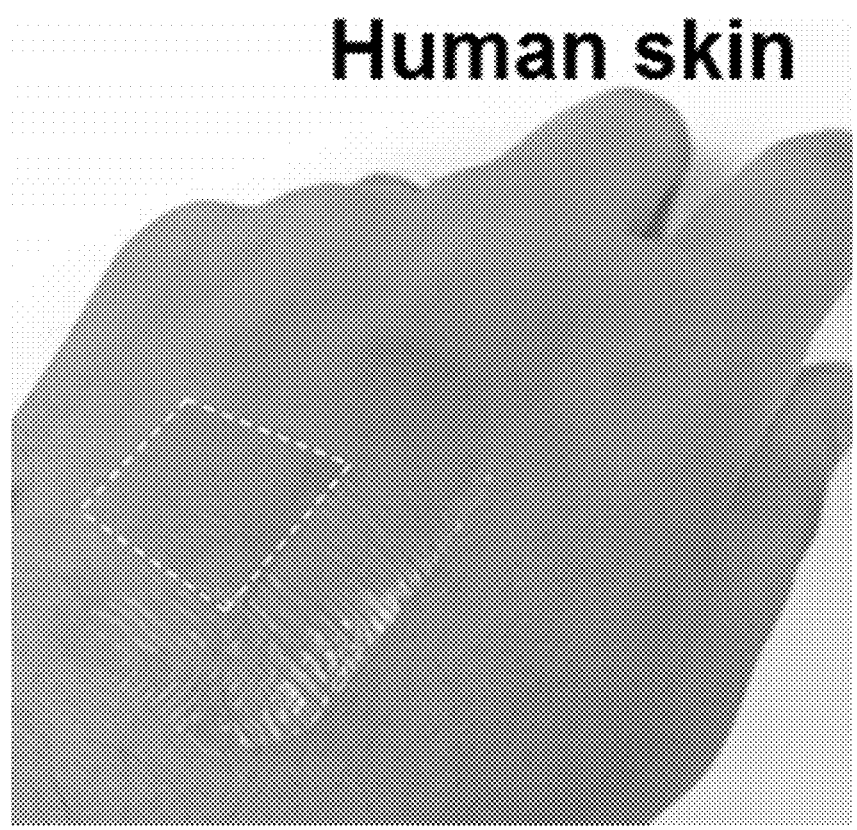

FIG. 1H is a photograph showing a nano membrane attached to a curved surface, and FIG. 1I is a photograph showing a nano membrane attached to a human body.

The nano membrane according to one embodiment of the present invention is transparent and is capable of being freely attached to any substrate having a curved and complex surface without mechanical damage.

FIGS. 2A to 2D are diagrams illustrating examples in which the nano membrane according to one embodiment of the present invention is attached to skin.

Figure 2A:
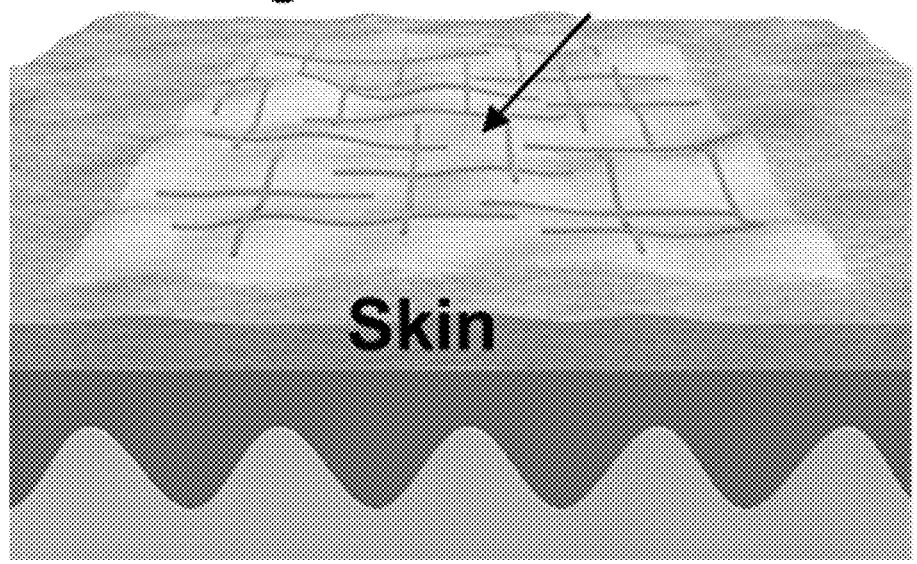
FIGS. 2A to 2D are diagrams illustrating examples in which the nano membrane according to one embodiment of the present invention is attached to skin.
Figure 2B:
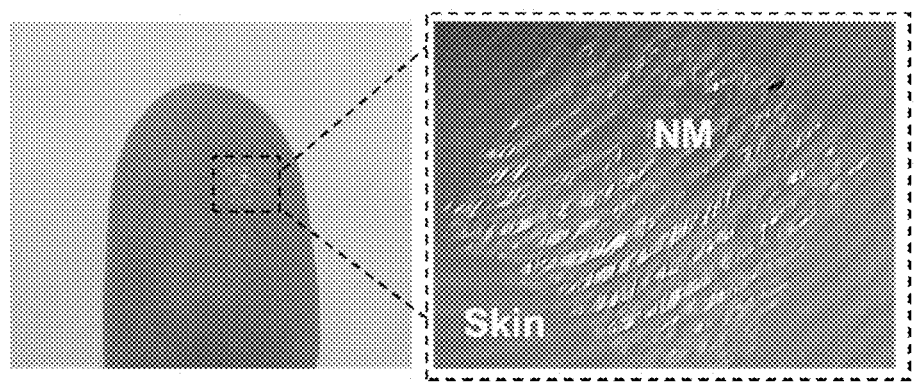

Specifically, FIG. 2A is a schematic diagram illustrating a case in which a nano membrane is attached to a surface of skin, and FIG. 2B is a photograph showing a nano membrane attached to a thumb.

Referring to FIGS. 2A and 2B, the nano membrane according to one embodiment of the present invention may provide a high level of bendability due to very low bending stiffness resulting from a nanoscale thickness and may be easily attached to a three-dimensional (3D) surface.

That is, since the nano membrane according to one embodiment of the present invention may be suitably adhered to human skin having a curved and uneven complex topography, there is an advantage in that the nano membrane is capable of being applied to a wearable appliance.

Figure 2C:
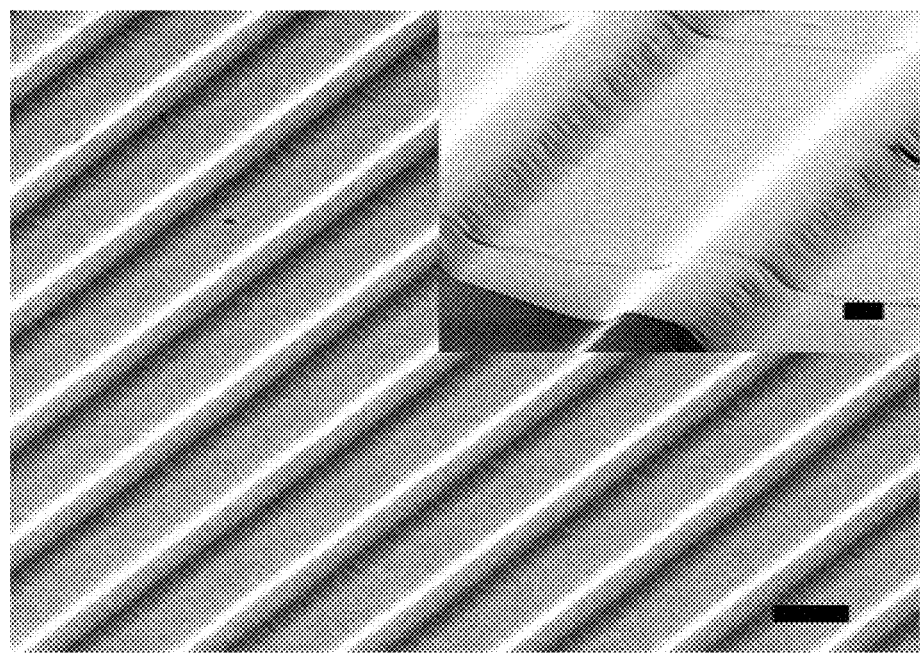
Figure 2D:
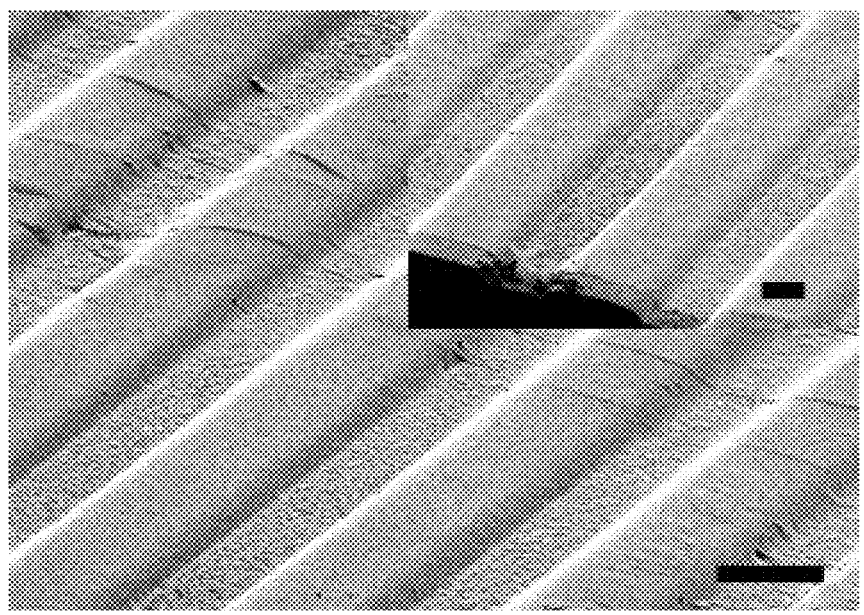

FIGS. 2C and 2D are SEM images of the nano membrane according to one embodiment of the present invention, which are captured after the nano membrane is attached to each of line pattern 3D polydimethylsiloxane (PDMS) fine structures having widths of 20 µm and 120 µm.

In order to further study a conformal contact of the nano membrane in the 3D fine structure, the nano membrane according to one embodiment of the present invention was transferred to each of a PDMS surface having line widths of 20 µm and 120 µm. The nano membrane was in conformal contact with the line pattern of the 3D PDMS fine structure along an edge of each of line patterns of the PDMS, and this exhibits that the nano membrane according to one embodiment of the present invention has high bendability due to low bending stiffness.

FIGS. 3A to 3E are diagrams showing mechanical properties of the nano membrane according to one embodiment of the present invention.

Figure 3A:
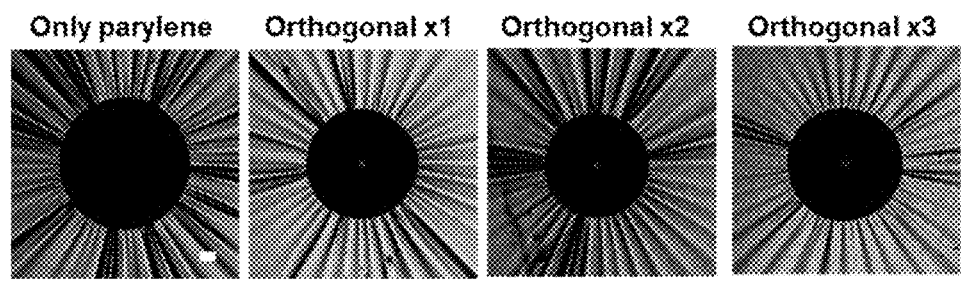
FIGS. 3A to 3E are diagrams showing mechanical properties of the nano membrane according to one embodiment of the present invention.

Specifically, FIG. 3A is photographs showing a result of a capillary wrinkle test for measuring wrinkles on a surface of the nano membrane, which are caused by a droplet falling on the surface, according to density of silver nanowires.

In order to measure Young's modulus of the nano membrane according to one embodiment of the present invention, a capillary wrinkle test was performed such that a water droplet was placed at centers of a pure polymer (Only parylene), a nano membrane (Orthogonal x1), a nano membrane (Orthogonal x2) having a density of silver nanowires two times that of the nano membrane (Orthogonal x1), and a nano membrane (Orthogonal x3) having a density of silver nanowires three times that of the nano membrane (Orthogonal x1).

When the water droplet falls at the center of the nano membrane, wrinkles are formed on the surface of the nano membrane by a capillary force, and the number of the wrinkles formed on the nano membrane decreases as a density of the cross-aligned silver nanowires increases. That is, it was confirmed that Young's modulus of the nano membrane increases as the density of the silver nanowires increases.

Figure 3B:
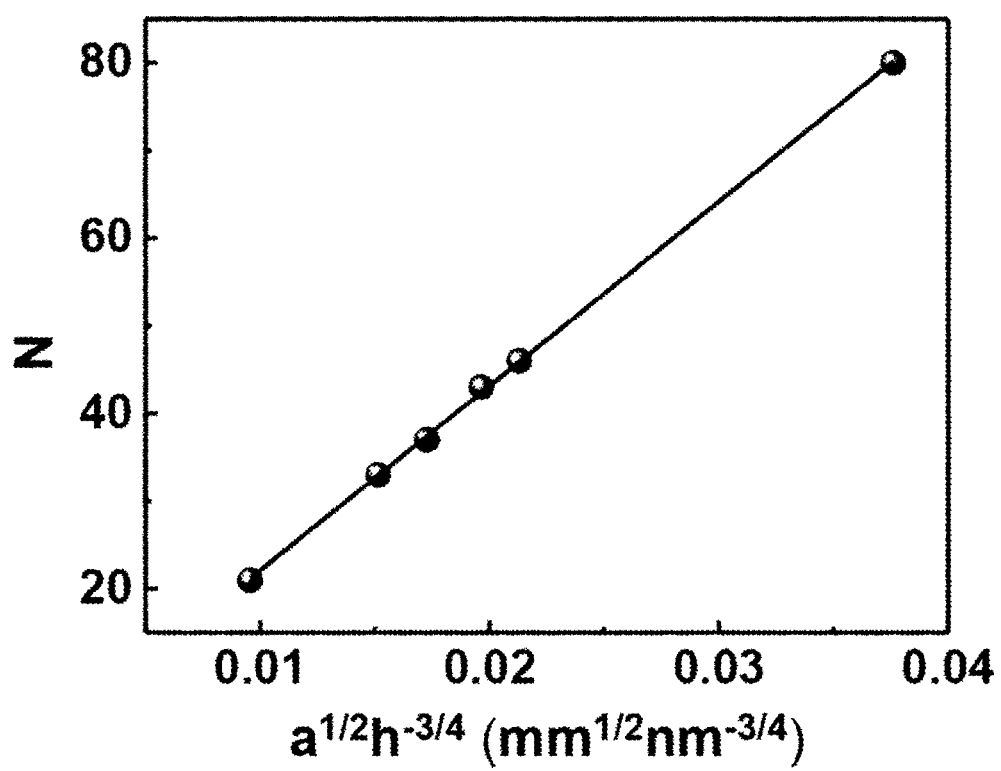

FIG. 3B is a graph showing the number of wrinkles on the surface of the nano membrane caused by a water droplet.

Referring to FIG. 3B, in order to further research an effect of a cross-aligned silver nanowire array on the Young's modulus of the nano membrane, the number of wrinkles N of the nano membrane is represented by a function of $a^{1/2}h^{-3/4}$, wherein a is a radius of the water droplet and h is a thickness of the nano membrane.

Elastic modulus of the nano membrane may be calculated according to the following Equation 1.

$$N = C_N \left[ \frac{12(1-\Lambda^2)\gamma}{E} \right]^{1/4} a^{1/2} h^{-3/4} \qquad \text{[Equation 1]}$$

Here, $\Lambda$ is a Poisson's ratio, $\gamma$ is surface tension of the water droplet, E is Young's modulus of the nano membrane, and $C_N$ is a coefficient. In the graph of FIG. 3B, the coefficient $C_N$ was calculated as 3.2.

Figure 3C:
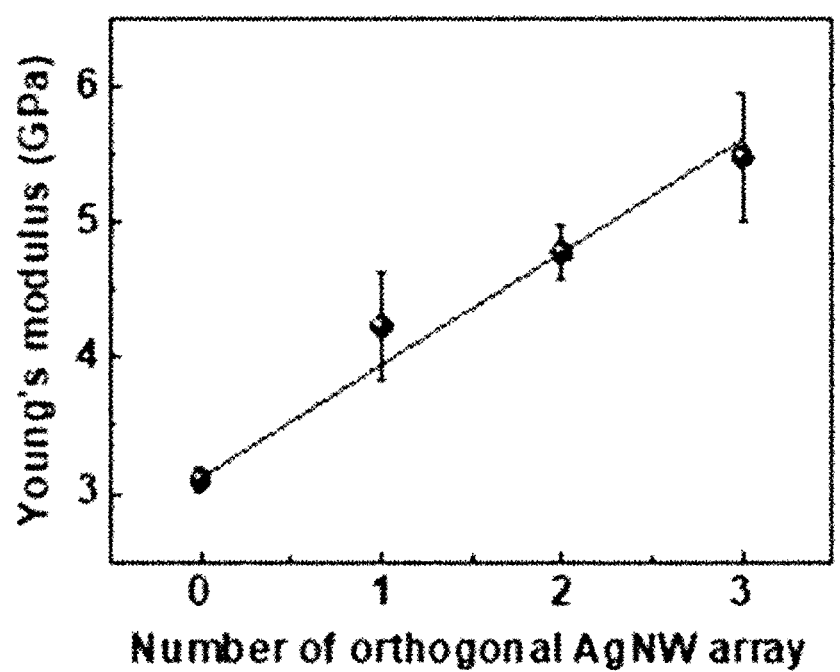

FIG. 3C is a graph showing the Young's modulus of the nano membrane according to the density of the silver nanowires calculated through the wrinkle test.

Referring to FIG. 3C, as the number of orthogonally-arranged silver nanowires (Number of orthogonal AgNW array) increases, the Young's modulus of the nano membrane increases linearly.

Figure 3D:
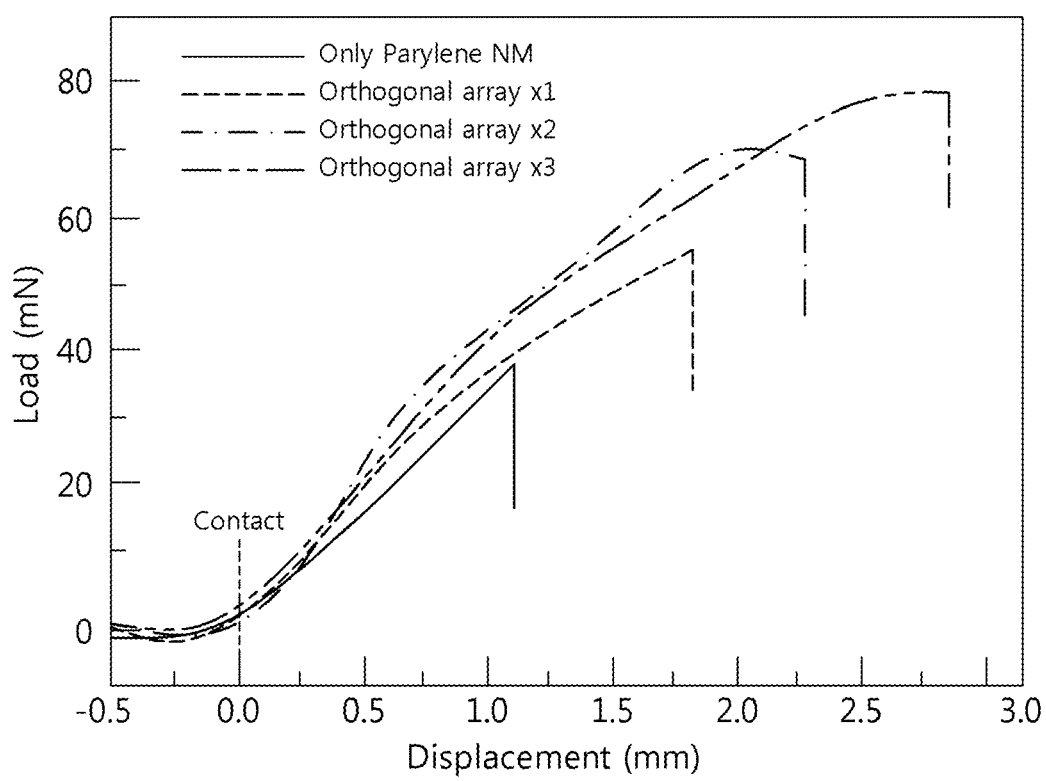

FIG. 3D is a graph showing an indentation load (Load) with respect to a displacement of the nano membrane according to a density of a cross-aligned silver nanowire array.

Referring to FIG. 3D, the nano membrane had an indentation load higher than that of a pure polymer (Only parylene NM), and among the nano membranes, the indentation load was measured to be higher as the density of the silver nanowires increases.

Figure 3E:
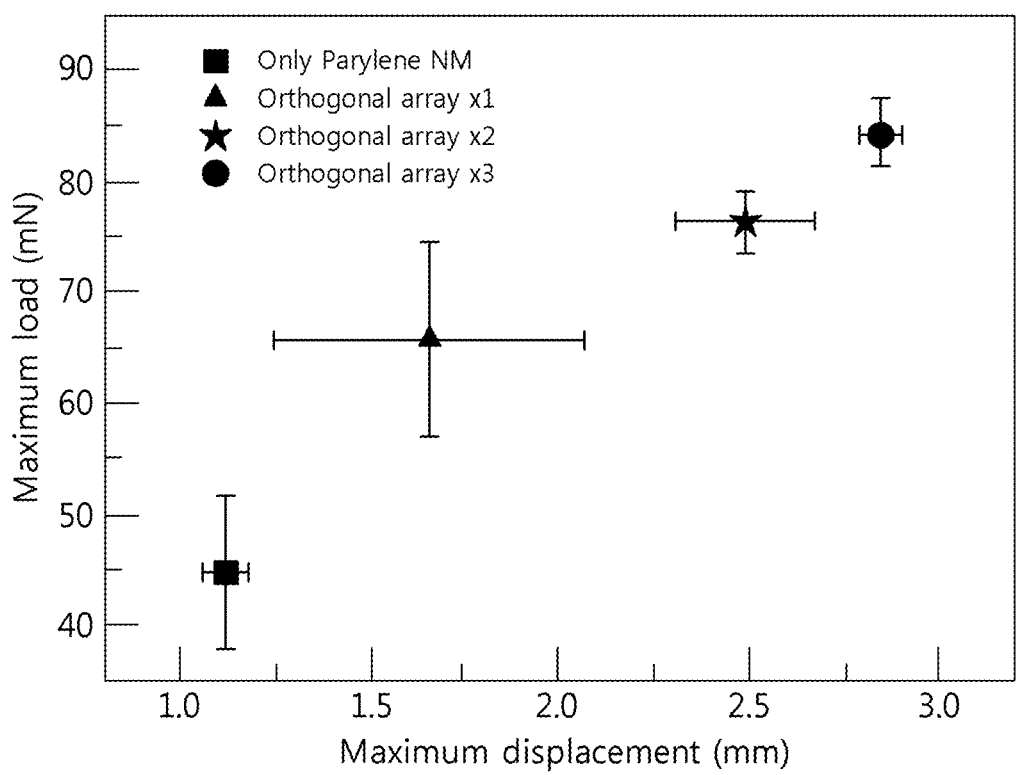

FIG. 3E is a graph showing a maximum indentation load (Maximum load) with respect to a maximum displacement (Maximum displacement) of the nano membrane according to the density of the silver nanowires.

Referring to FIG. 3E, the maximum indentation load of the nano membrane according to one embodiment of the present invention is gradually increased as a density of an orthogonally-arranged silver nanowire array increases.

A maximum indentation load of a nano membrane (Orthogonal array x3) having a largest density of the silver nanowires was about 85 mN, and a maximum indentation load of a nano membrane (only parylene NM), which contains only parylene but no silver nanowires, was about 45 mN so that it was confirmed that a difference in maximum indentation load of the nano membrane was about twice according to whether the orthogonally-arranged silver nanowires are contained.

An effective interface is possible due to efficient mechanical reinforcement of an orthogonally-arranged silver nanowire network such that an efficient load transfer inside a polymer matrix in a nano composite material system is induced. These results suggest that the orthogonally-arranged silver nanowires may become a good loading material for improving mechanical properties of the nano membrane.

Figure 4:
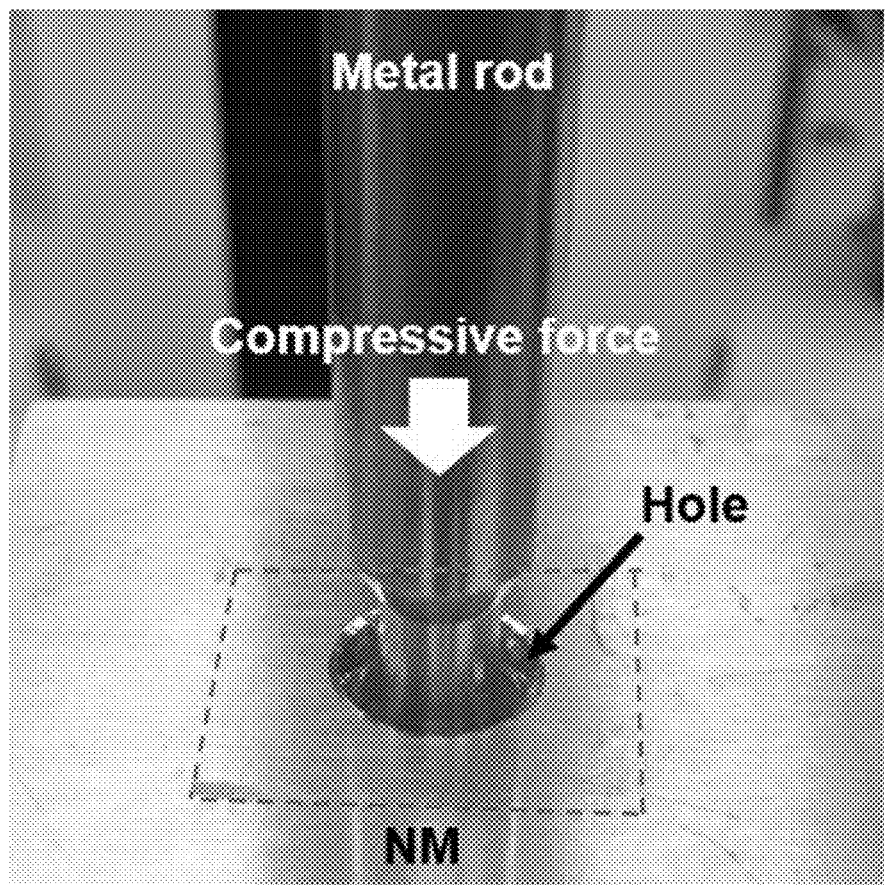
FIG. 4 is a photograph showing an example of an indentation test for measuring mechanical properties of the nano membrane according to one embodiment of the present invention.

FIG. 4 is a photograph showing an example of an indentation test for measuring mechanical properties of the nano membrane according to one embodiment of the present invention.

Referring to FIG. 4, in order to measure mechanical toughness of the nano membrane according to one embodiment of the present invention, a test was performed to measure an indentation load according to a density of the cross-aligned silver nanowire array. For the indentation load measuring test, the nano membrane according to one embodiment of the present invention was attached to a support plate with a hole having a diameter of 10 mm, and a force was applied by a metal rod to deform and measure a maximum load limit of the nano membrane.

Figure 5:
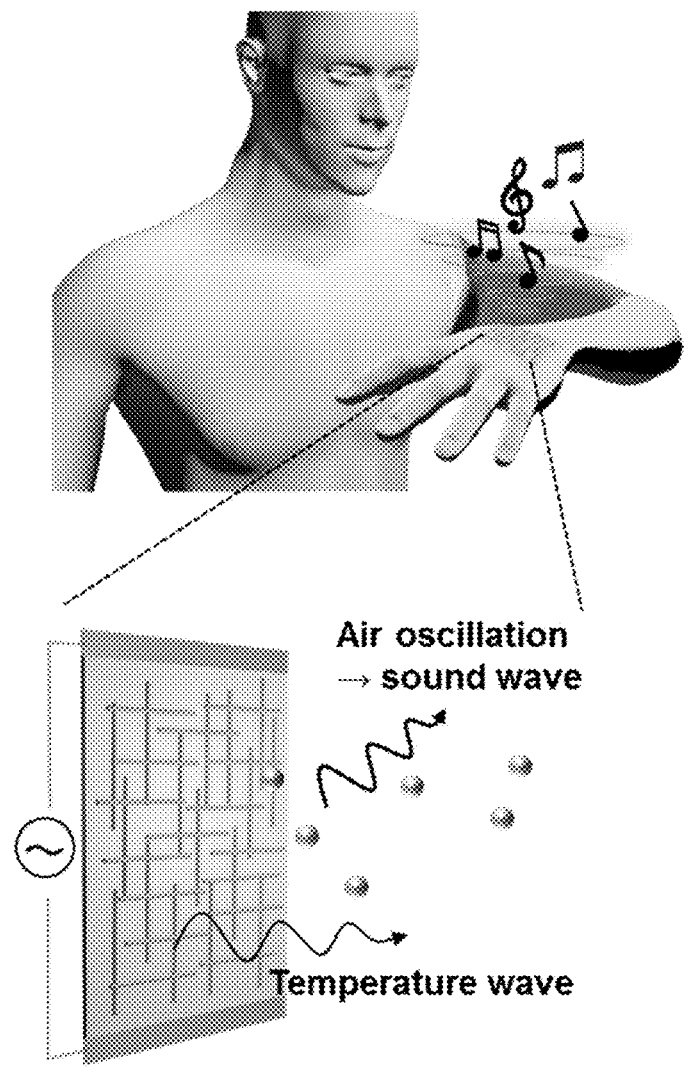
FIG. 5 is a diagram illustrating a speaker using the nano membrane according to one embodiment of the present invention.

FIG. 5 is a diagram illustrating a speaker using the nano membrane according to one embodiment of the present invention.

Referring to FIG. 5, the speaker using the nano membrane according to one embodiment of the present invention is capable of being easily attached to a human body with, e.g., a thickness of 100 nm or less to be applied to a wearable speaker.

The speaker using the nano membrane according to one embodiment of the present invention may include a voltage portion for applying an alternating current (AC) voltage to the nano membrane.

The voltage portion may change a frequency of the AC voltage every predetermined period and apply the AC voltage having the changed frequency to the nano membrane.

In addition, the speaker using the nano membrane according to one embodiment of the present invention may further include a frequency measuring portion for measuring a frequency of an input sound signal per time interval.

The frequency measuring portion may measure the frequency of the input sound signal per time interval, and the voltage portion may change the frequency of the AC voltage to correspond to the measured frequency to apply the AC voltage of the changed frequency to the nano membrane.

For example, when the voltage portion applies AC voltages of the same frequency to the nano membrane, the same sound is output from the nano membrane, and when the voltage portion applies an AC voltage to the nano membrane while changing a frequency of the AC voltage to correspond to the frequency measured by the frequency measuring portion, a music sound may be output.

In the speaker using the nano membrane according to one embodiment of the present invention, ambient air expands and contracts due to heat generated by applying an AC voltage to the nano membrane so that vibration occurs to cause acoustic emission.

That is, when an AC voltage is applied to the speaker using the nano membrane according to one embodiment of the present invention, joule heat is generated by resistance generated in metal nanowires included in the nano membrane, and ambient air vibrates while expanding and contracting due to the generated joule heat to cause emission of a thermoacoustic sound.

FIGS. 6A to 6E are diagrams showing experimental data of thermal properties according to an arrangement of silver nanowires with which a PET surface is coated.

Figure 6A:
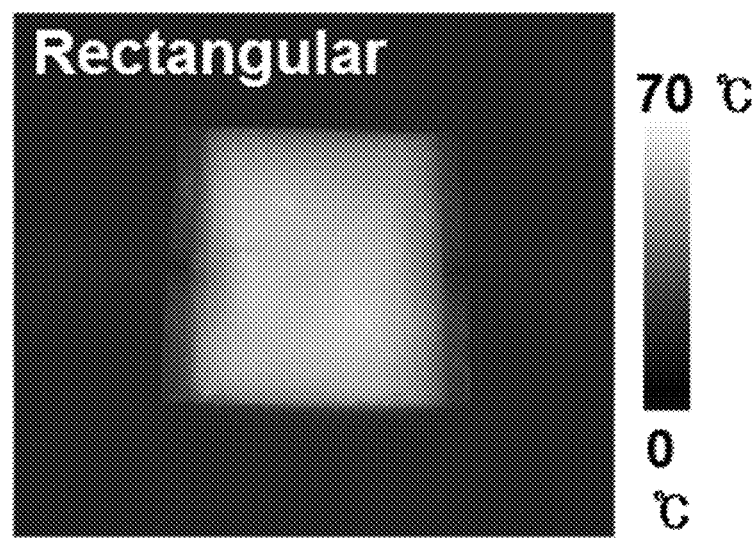
FIGS. 6A to 6E are diagrams showing experimental data of thermal properties according to an arrangement of silver nanowires with which a polyethylene terephthalate (PET) surface is coated.
Figure 6B:
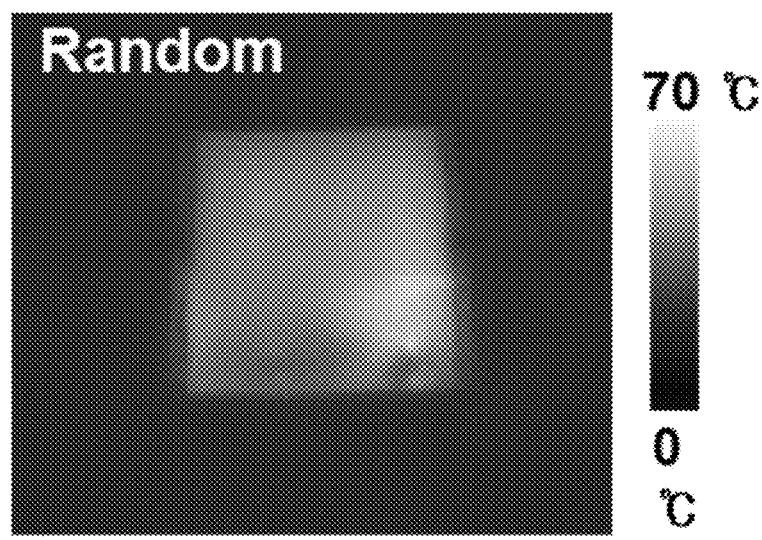

FIGS. 6A and 6B are photographs capturing, by an infrared camera, joule heat characteristics of silver nanowires orthogonally-arranged on a surface of PET (hereinafter referred to as rectangular silver nanowires) and silver nanowires randomly arranged on the surface of the PET (hereinafter referred to as random silver nanowires).

Referring to FIGS. 6A and 6B, when the same direct-current (DC) voltage is applied, it was confirmed that the rectangular silver nanowires have a uniform thermal distribution and an improved joule heat performance compared to the random silver nanowires.

Due to contact points between the silver nanowires which are orthogonally-arranged and uniformly distributed and a low percolation threshold value according to the cross-aligned silver nanowire array, it was confirmed that the thermal distribution and the joule heat performance of the rectangular silver nanowires were improved more than those of the random silver nanowires.

Particularly, since the thermal distribution of the random silver nanowires is not uniform, "hot spots" may be brought about to cause degradation of the joule heat performance.

Figure 6C:
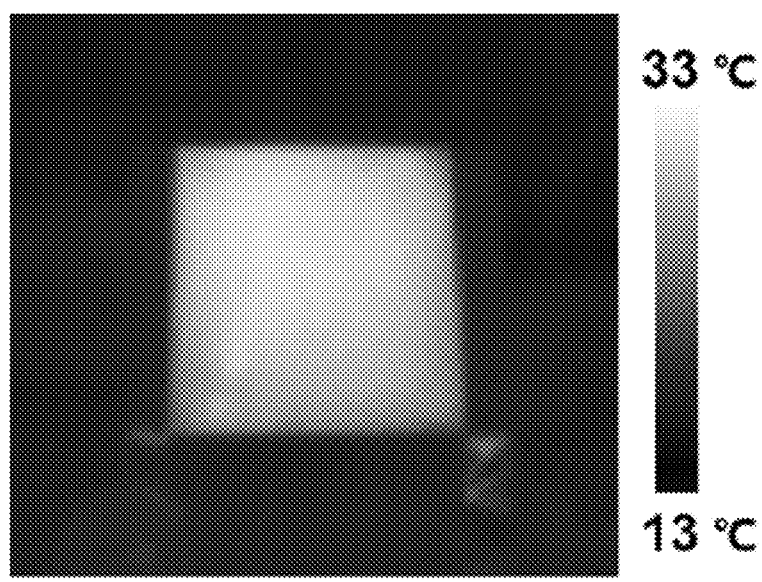

FIG. 6C is a photograph capturing, by an infrared camera, a joule heat characteristic of a rectangular silver nanowire network in which silver nanowires are orthogonally-arranged when an AC voltage of 10 V having a frequency of 10 kHz is applied.

Referring to FIG. 6C, since the silver nanowires are orthogonally arranged in the rectangular silver nanowires and thus the thermal distribution is uniform to not cause "hot spots," there is an advantage in that the joule heat performance is not degraded.

Figure 6D:
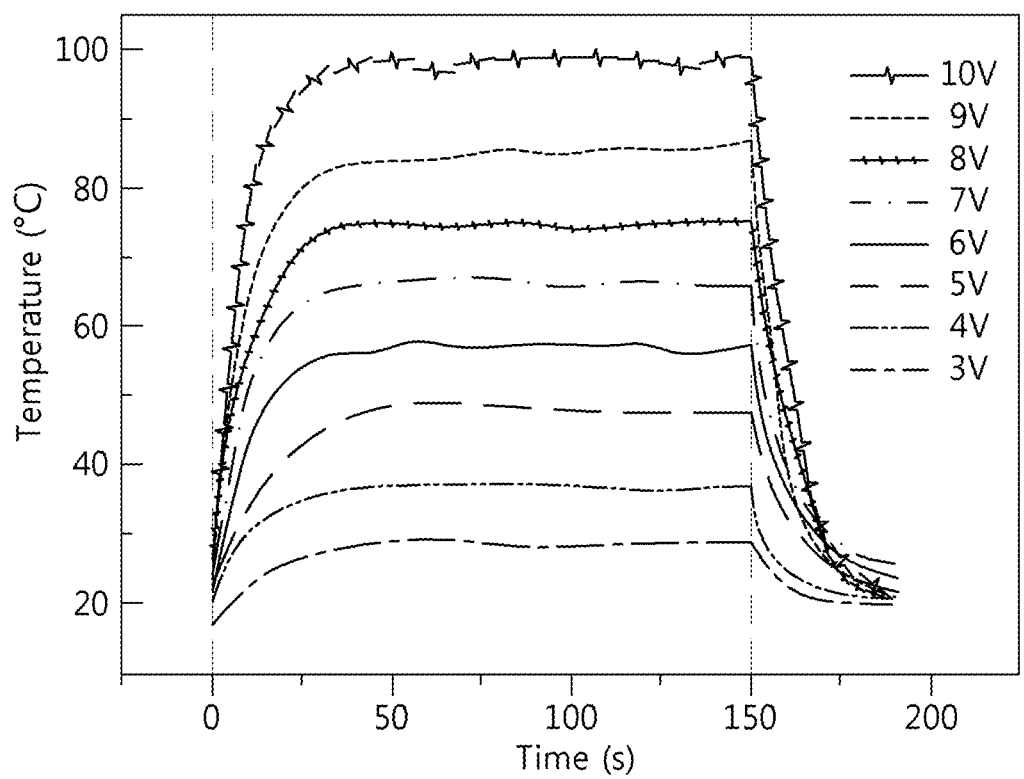
Figure 6E:
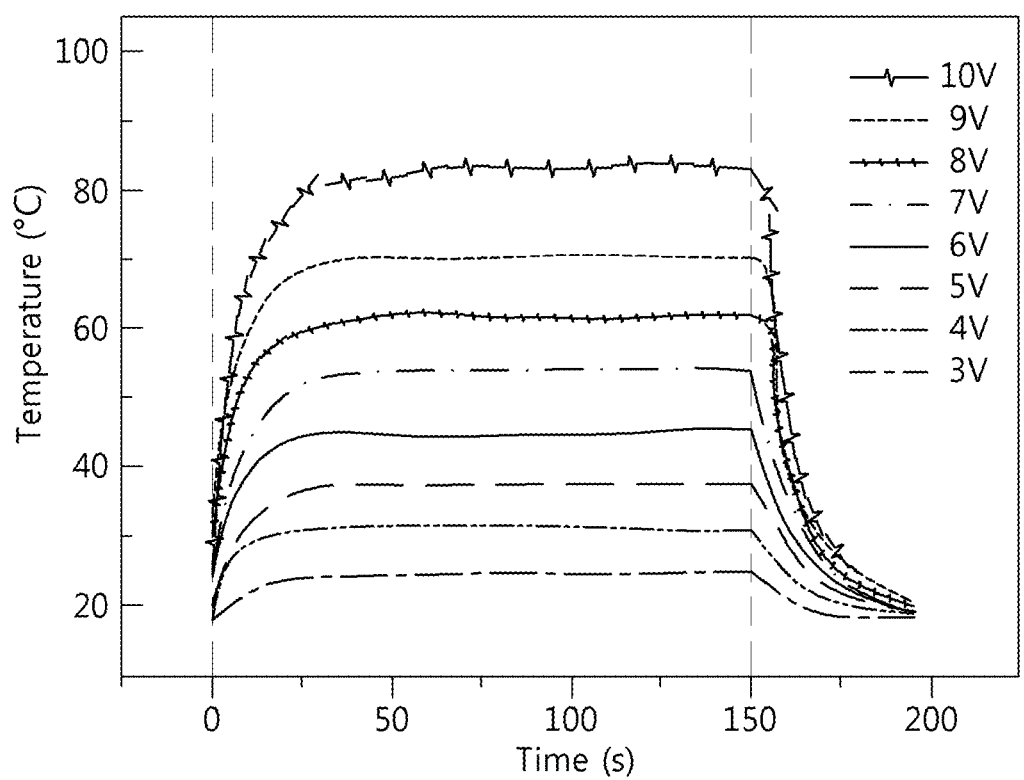

FIGS. 6D and 6E are graphs showing changes over time in temperature when a DC voltage is applied to each of the rectangular silver nanowires and the random silver nanowires.

Referring to FIGS. 6D and 6E, temperature profiles of the rectangular silver nanowires and the random silver nanowires were measured while the applied DC voltage is varied in the range of 3V to 10V.

As can be seen from the measured temperature profiles, the rectangular silver nanowires exhibited joule heat performance much higher than that of the random silver nanowires due to an effective current flow through a uniform conductive network and the low percolation threshold value.

In order to calculate heat generated by the silver nanowire network, Joule's law was used and a saturation temperature $T_s$ of the silver nanowire network may be calculated according to the following Equation 2.

$$T_s = \frac{U^2 t/R - Q_d}{Cm} + T_i \quad \text{[Equation 2]}$$

Here, $T_i$ is an initial temperature, U is an applied voltage, t is a heating time, R is resistance of a heated film, $Q_d$ is dissipation heat, C is a heat capacity ratio of the heated film, and m is a mass of the heated film.

It was measured that a mass (or a percolation threshold value) of silver nanowires in the heated film affected heat dissipation performance of the silver nanowire network.

Referring to FIGS. 6A to 6E, when the same voltage is applied, a temperature of the rectangular silver nanowires rises uniformly faster than that of the random silver nanowires, and thus it can be seen that the heat dissipation performance of the rectangular silver nanowires is superior to that of the random silver nanowires.

That is, when the same voltage is applied for the same time, the rectangular silver nanowires radiate a larger amount of heat than the random silver nanowires.

Consequently, since the speaker using the nano membrane according to one embodiment of the present invention heats ambient air better than a speaker using a nano membrane in which silver nanowires are randomly arranged, it can be seen that sound output performance in which a sound is generated by vibration of the ambient air is more excellent.

Figure 7:
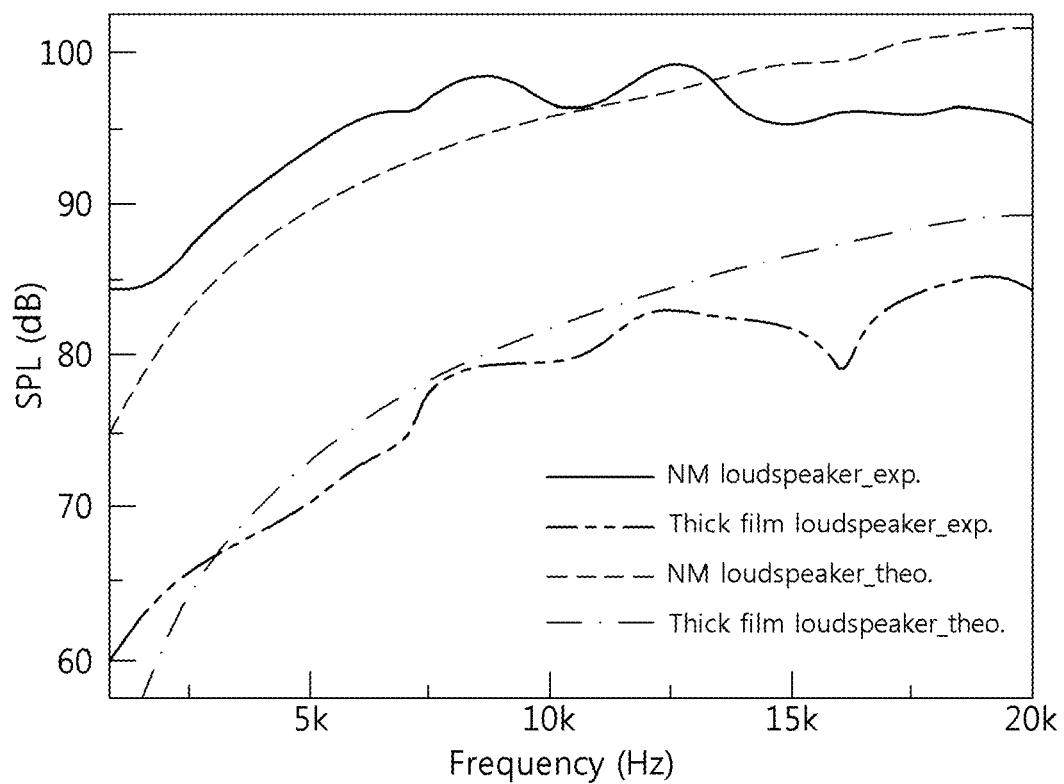
FIG. 7 is a graph showing a sound pressure level (SPL) according to input power of a speaker (NM loudspeaker) using the nano membrane according to one embodiment of the present invention and a speaker (Thick film loudspeaker) using a general substrate.

FIG. 7 is a graph showing a sound pressure level (SPL) according to input power of a speaker (NM loudspeaker) using the nano membrane according to one embodiment of the present invention and a speaker (Thick film loudspeaker) using a general substrate.

Referring to FIG. 7, a measured SPL (NM loudspeaker_exp.) of the speaker (NM loudspeaker) using the nano membrane according to one embodiment of the present invention is measured to be higher than a theoretical SPL (NM loudspeaker_theo.) at a frequency of about 13 kHz or less.

On the other hand, a measured SPL (Thick film loudspeaker_exp.) of the speaker (Thick film loudspeaker) using a general substrate having a thickness of about 220 μm was measured to be lower than a theoretical SPL (NM loudspeaker_theo.) at a frequency of about 3 kHz or more.

Further, it was confirmed that the sound pressure output performance of the speaker (NM loudspeaker) using the nano membrane according to one embodiment of the present invention was improved more than the sound pressure output performance of the speaker using the general substrate (Thick film loudspeaker).

When an AC voltage is applied, the speaker (NM loudspeaker) using the nano membrane according to one embodiment of the present invention may minimize a loss of resistance heat generated by the silver nanowires due to the orthogonally-arranged silver nanowires and an ultra-thin film thickness of about 100 nm, thereby providing improved sound pressure performance over all sound frequency ranges more than a speaker using a substrate having a general thickness of 220 μm.

Figure 8:
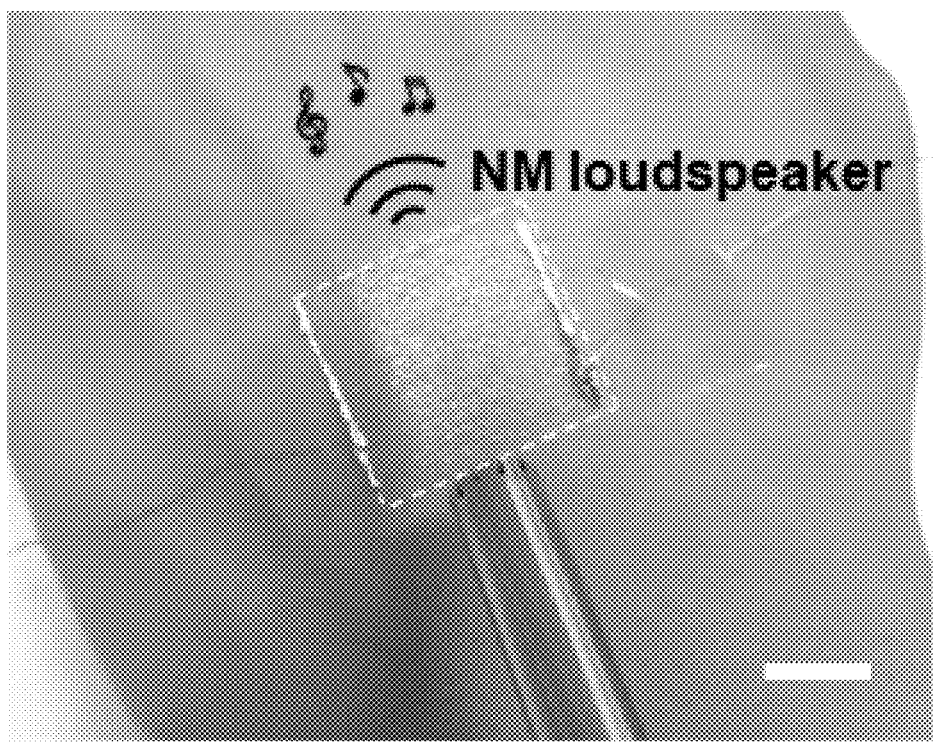
FIG. 8 is a diagram illustrating a case in which a speaker using the nano membrane according to one embodiment of the present invention is attached to a human body.

FIG. 8 is a diagram illustrating a case in which a speaker using the nano membrane according to one embodiment of the present invention is attached to a human body.

Referring to FIG. 8, the nano membrane according to one embodiment of the present invention may provide a high level of bendability due to very low bending stiffness resulting from a nanoscale thickness and may be easily attached to a 3D surface such as skin.

FIGS. 9A to 9E are diagrams illustrating a microphone using the nano membrane according to one embodiment of the present invention.

Figure 9A:
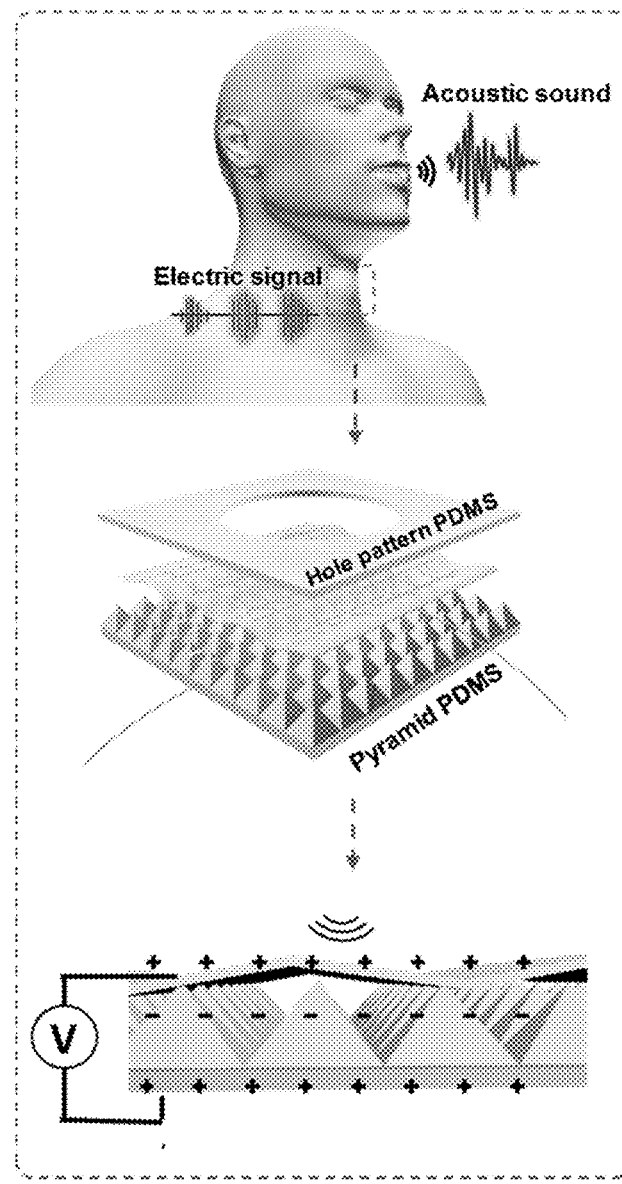
FIGS. 9A to 9E are diagrams illustrating a microphone using the nano membrane according to one embodiment of the present invention.

Specifically, FIG. 9A is a diagram illustrating a triboelectric sound detection mechanism of a microphone using the nano membrane according to one embodiment of the present invention.

Referring to FIG. 9A, the microphone using the nano membrane according to one embodiment of the present invention may include a nano membrane, a first polymer film bonded to an upper surface of the nano membrane, and a second polymer film bonded to a lower surface of the nano membrane. Further, the microphone may further include a measuring portion for measuring an output voltage of triboelectricity and a frequency thereof, which are generated by vibration of the nano membrane when a sound pressure is applied to the microphone using the nano membrane according to one embodiment of the present invention.

For example, the first and second polymer films may be PDMS films, and the microphone according to one embodiment of the present invention may have a sandwich structure in which the first polymer film, the nano membrane, and the second polymer film are bonded. At this point, one of both surfaces of the nano membrane, on which the silver nanowires are located, may be in contact with and coupled to the second polymer film.

The first polymer film may have a flat shape and may include a hole passing through a flat surface.

The second polymer film may include either of a plurality of horns, microdomes, or micropillars, which are regularly arranged on a surface of the second polymer film.

For example, when a plurality of horns are arranged on the surface of the second polymer film, vertexes of the horns may be brought into contact with the lower surface of the nano membrane. Similarly, when a plurality of microdomes or micropillars are arranged on the surface of the second polymer film, the plurality of microdomes or micropillars may be brought into contact with the lower surface of the nano membrane. When a sound pressure is transmitted to the nano membrane through the hole of the first polymer film, the nano membrane may vibrate and rub against the vertexes of the horns of the second polymer film while vibrating to generate a triboelectric signal. The measuring portion may measure the generated triboelectric signal to analyze a waveform of the generated triboelectric signal, and an AC signal corresponding to the analyzed waveform may be generated.

Figure 9B:
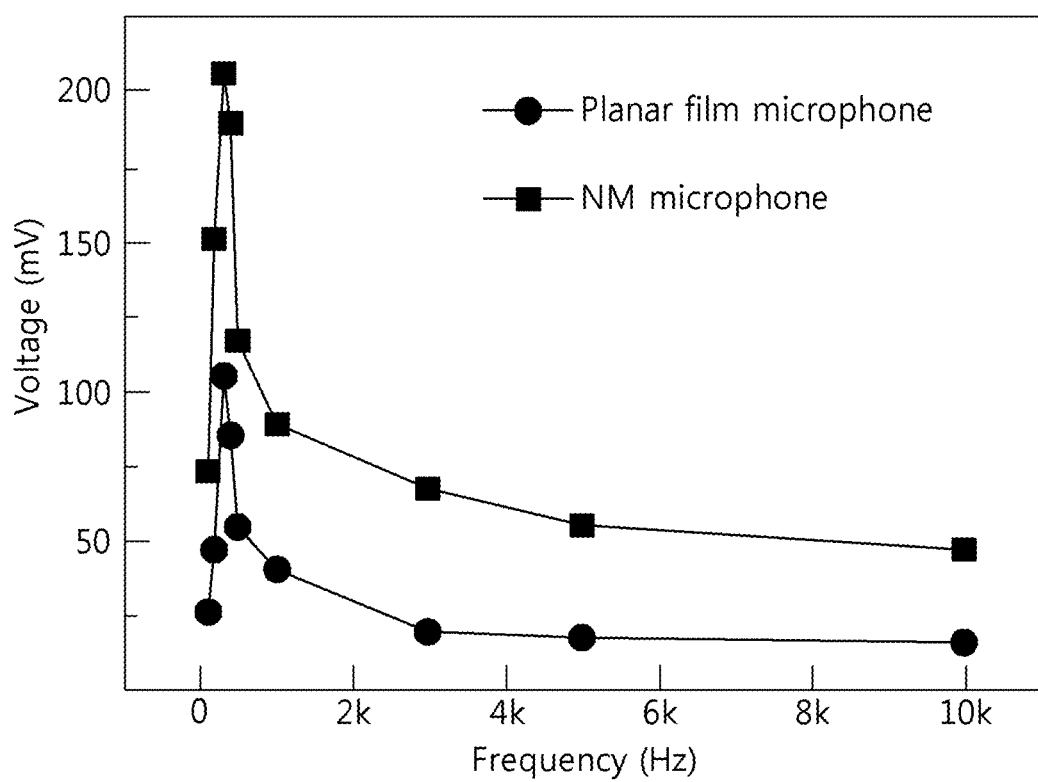
Figure 9C:
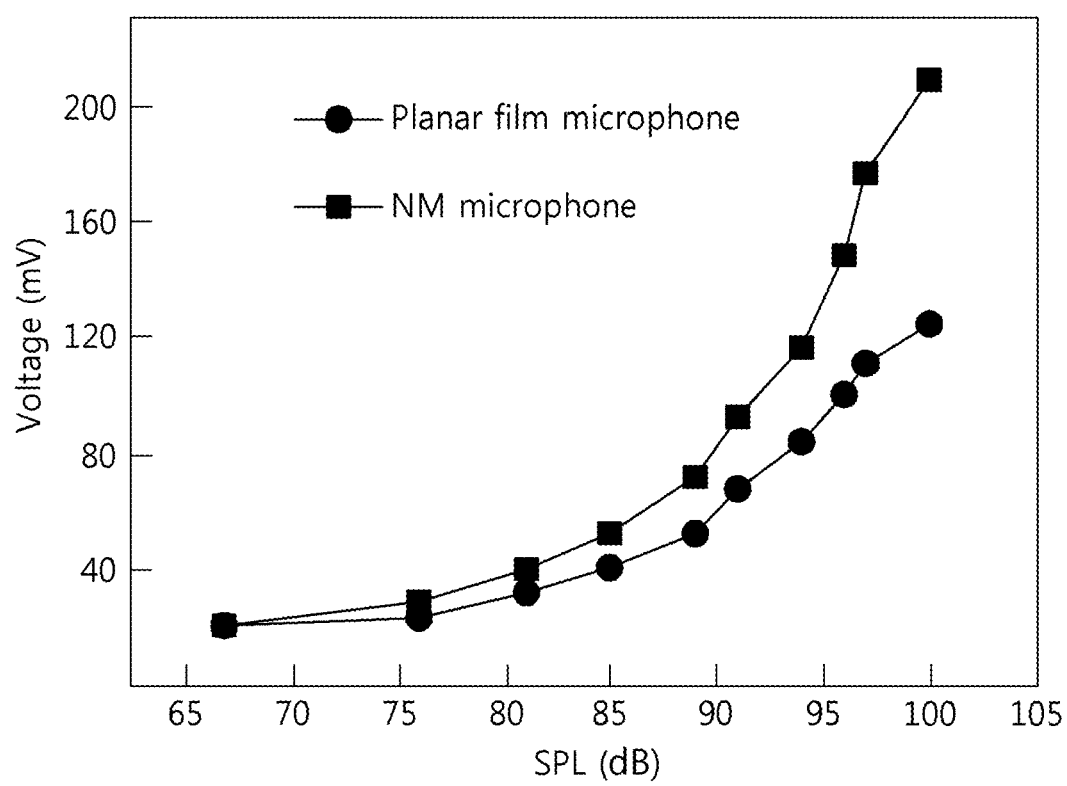

FIGS. 9B and 9C are graphs showing test data of measuring output voltages of triboelectricity of a microphone (NM microphone) including a second polymer film having micropyramids arranged on a surface of the second polymer film and a microphone (Planar film microphone) including a second polymer film having a flat surface according to a frequency and an SPL.

Referring to FIG. 9B, when the same frequency is input, the output voltage of the triboelectricity generated in the microphone (NM microphone) was measured to be larger than the output voltage of the triboelectricity generated in the microphone (Planar film microphone).

Referring to FIG. 9C, when the same SPL is input, the output voltage of the triboelectricity generated in the microphone (NM microphone) was measured to be larger than the output voltage of the triboelectricity generated in the microphone (Planar film microphone).

That is, since the second polymer film having the flat surface is in strong contact with the nano membrane, vibration of a nano membrane included in the microphone (Planar film microphone) may occur less than vibration of a nano membrane included in the microphone (NM microphone).

Since the output voltage of the triboelectricity is increased as the vibration occurs greatly and the microphone becomes excellent in sound detection performance as the output voltage of the triboelectricity is increased, it was confirmed that the sound detection performance of the microphone (NM microphone) including the second polymer film having a flat surface is superior to the sound detection performance of the microphone (Planar film microphone).

Figure 9D:
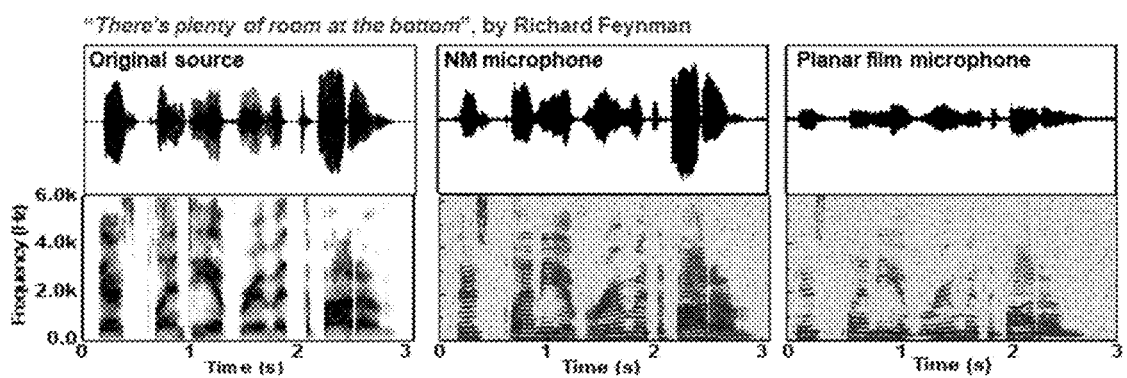

FIG. 9D is a graph showing waveforms and short-time Fourier transforms (STFTs) of input signals when the same sounds are input to a conventional sound wave analyzer (left), the microphone (NM microphone) (center), and the microphone (Planar film microphone) (right).

Referring to FIG. 9D, when a sentence of "There's plenty of room at the bottom" is input to the conventional sound wave analyzer, the microphone (NM microphone), and the microphone (Planar film microphone), a waveform and a spectrogram of the output voltage from the conventional sound wave analyzer coincided with those of the output voltage from the microphone (NM microphone).

However, the waveforms and the spectrograms of the output voltages of the conventional sound wave analyzer and the microphone (Planar film microphone) were measured very differently, and it was confirmed that the sound detection performance of the microphone (NM microphone) is superior to the sound detection performance of the microphone (Planar film microphone) through the test.

Figure 9E:

FIG. 9E is a diagram illustrating an example of performing a sound detection test by attaching the microphone using the nano membrane according to one embodiment of the present invention to a human body.

Like the nano membrane according to one embodiment of the present invention, since the microphone using the nano membrane is based on a thin elastic polymer PDMS film, the microphone may be easily attached to a curved 3D surface like the human body.

Further, since all the nano membrane and the polymer film are transparent, there is an advantage of not disturbing a field of view field even when the microphone is attached to a neck of human.

Figure 10A:
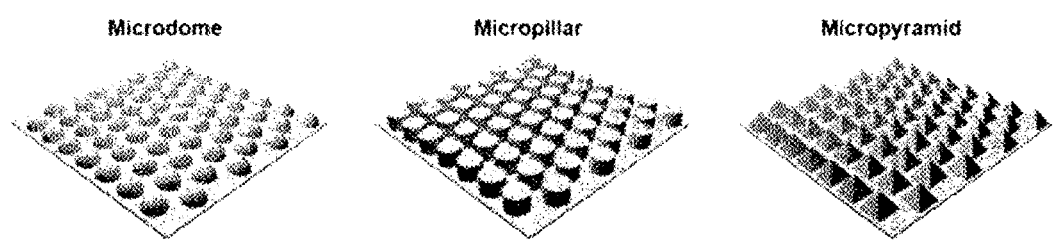
FIGS. 10A to 10C are diagrams showing a comparison of patterns of a polymer film included in the microphone using the nano membrane according to one embodiment of the present invention.
Figure 10B:
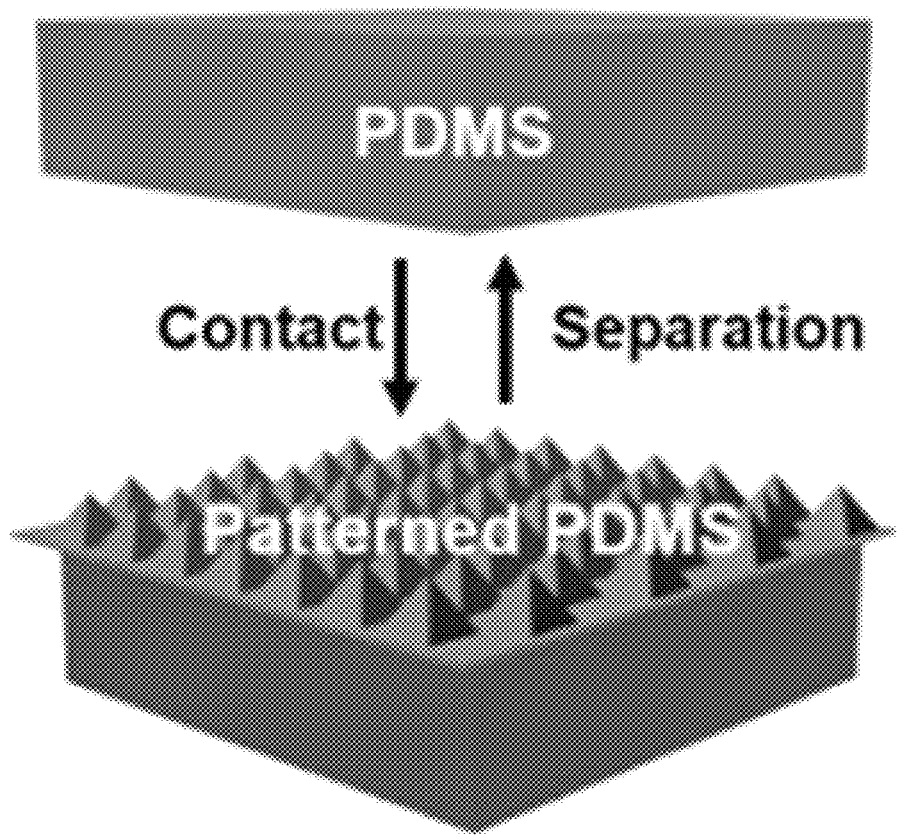
Figure 10C:
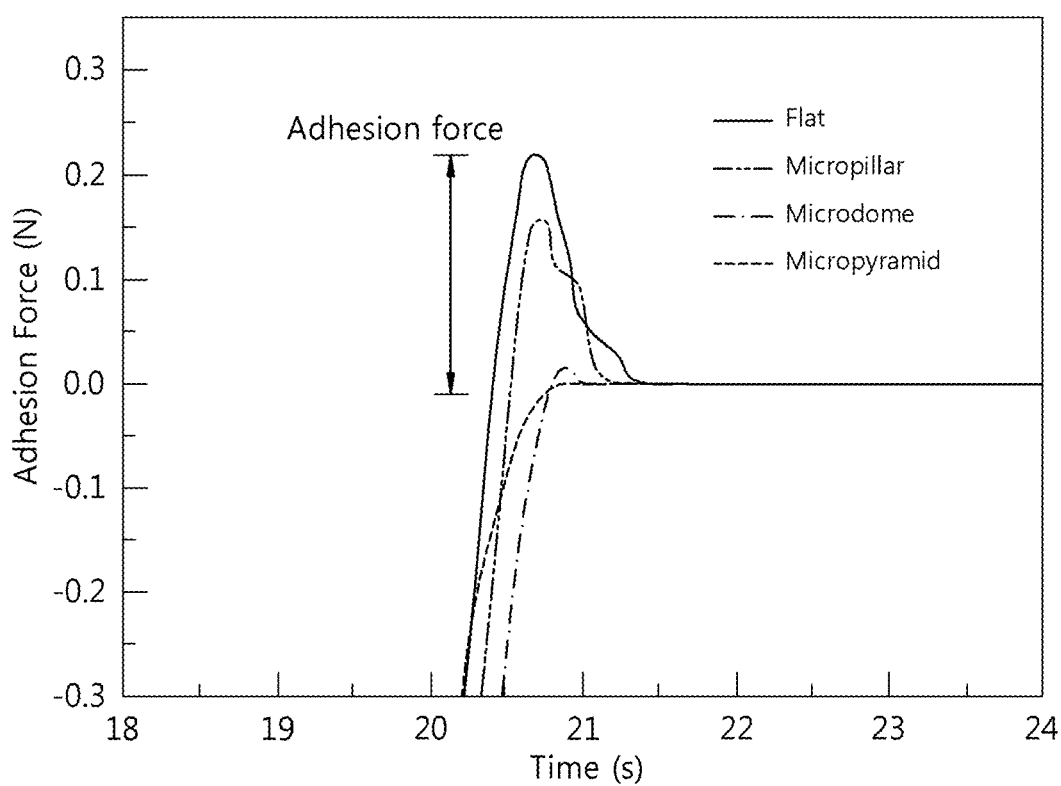

FIGS. 10A to 10C are diagrams showing a comparison of patterns of a polymer film included in the microphone using the nano membrane according to one embodiment of the present invention.

FIG. 10A is a diagram illustrating a surface pattern of the second polymer film included in the microphone using the nano membrane according to one embodiment of the present invention.

Referring to FIG. 10A, either of microdomes, micropillars, or micropyramids may be regularly arranged on the surface of the second polymer film.

FIG. 10B is a conceptual diagram for measuring an adhesion force between the first and second polymer films.

FIG. 10C is a graph showing test data measuring the adhesion force between the first and second polymer films.

Referring to FIG. 10C, the surface of the second polymer film of the microphone using the nano membrane according to one embodiment of the present invention has a flat structure, a micropillar structure, a microdome structure, or a micropyramid structure, an adhesion force of the second polymer film in each of the flat structure, the micropillar structure, the microdome structure, and the micropyramid structure against the first polymer film having a flat structure was measured.

When the second polymer film having the flat structure was bonded to the first polymeric film, the adhesion force was measured to be highest at about 20.8 seconds because the first polymer film and the second polymer film adhered to each other and did not fall off easily.

In the case of the surface of the second polymer film having the micropillar structure, the microdome structure, or the micropyramid structure, an adhesion force was measured to be lower than that of the second polymer film with the surface having the flat structure. Particularly, the adhesion force of the second polymer film with the surface having the micropyramid structure was measured to be lowest, and thus performance of the second polymer film with the surface having the micropyramid structure was measured to be superior to performance of the second polymer films having the micropillar structure and the microdome structure.

Figure 11:
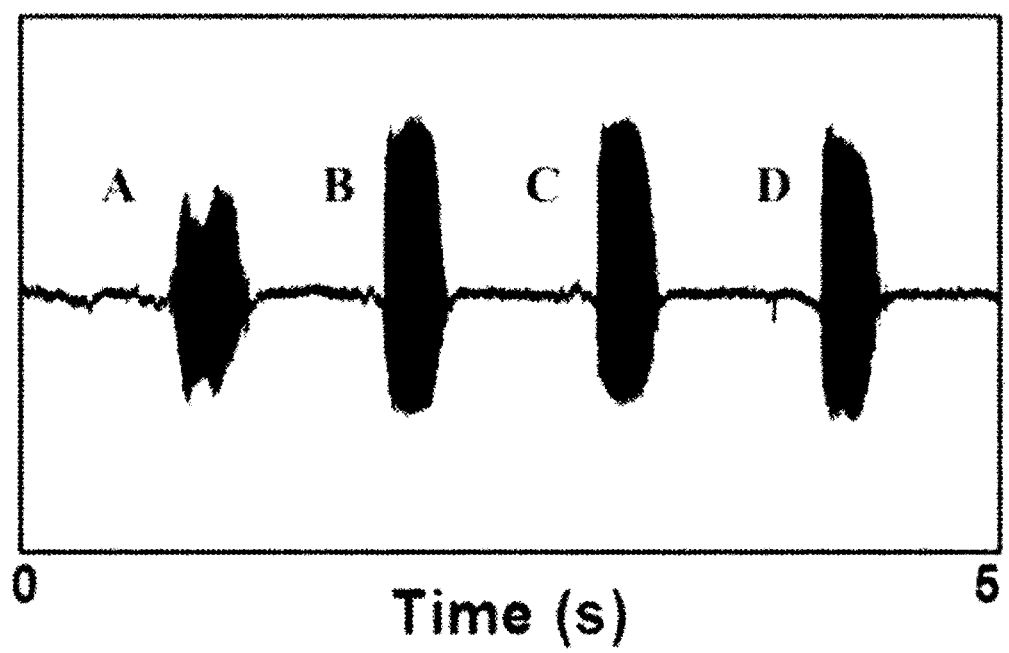
FIG. 11 is a diagram showing sound sensing performance of the microphone using the nano membrane according to one embodiment of the present invention.

FIG. 11 is a diagram showing sound sensing performance of the microphone using the nano membrane according to one embodiment of the present invention.

Referring to FIG. 11, when the microphone using the nano membrane according to one embodiment of the present invention is attached to a neck and then "A," "B," "C," and "D" are said, it was confirmed that each voice was clearly sensed by the microphone.

FIGS. 12A to 12D are photographs showing a process of removing a sacrificial layer of the nano membrane according to one embodiment of the present invention.

Figure 12A:
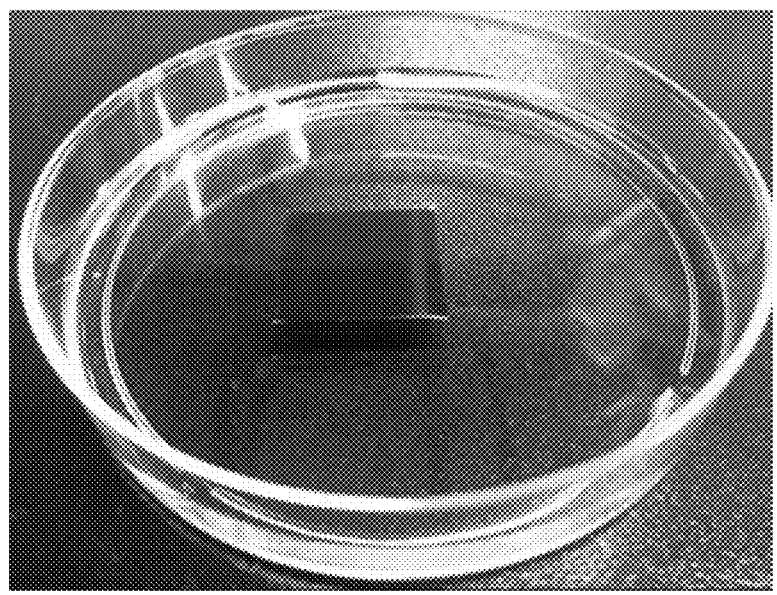
FIGS. 12A to 12D are photographs showing a process of removing a sacrificial layer of the nano membrane according to one embodiment of the present invention.
Figure 12B:
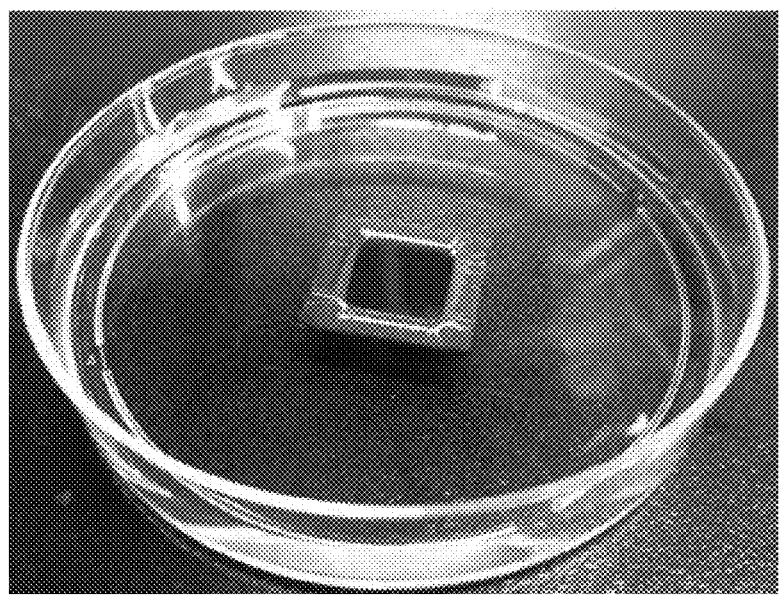
Figure 12C:
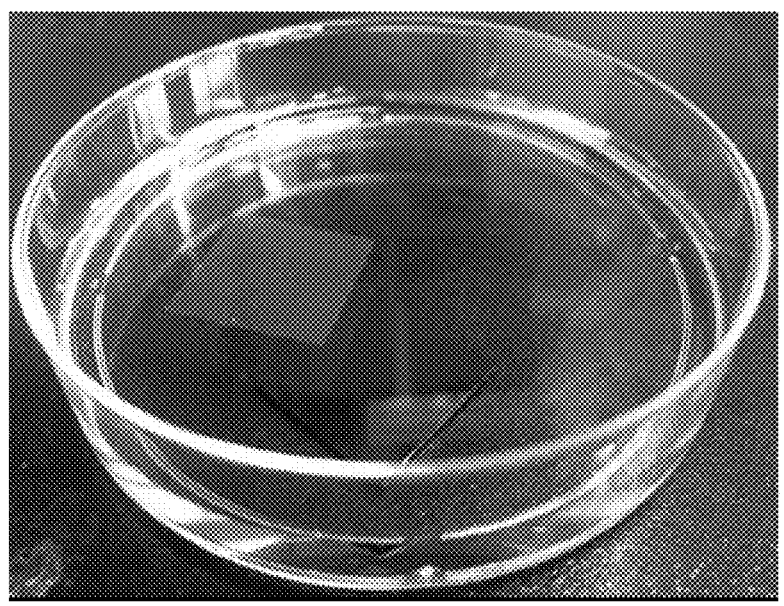

As shown in FIG. 12A, when a ZnO sacrificial layer is formed on the Si substrate and a nano membrane formed on the ZnO sacrificial layer is floated in an etchant solution, the ZnO sacrificial layer is dissolved by the etchant solution with the passage of time as shown in FIG. 12B, and when the ZnO sacrificial layer is completely dissolved and removed, the Si substrate and the nano membrane are separated from each other as shown in FIG. 12C.

Figure 12D:
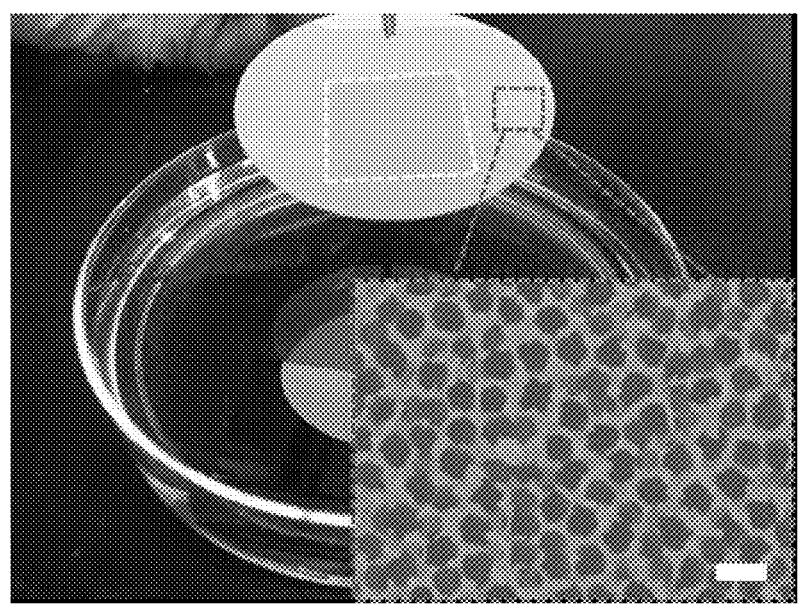

FIG. 12D is a SEM image captured by attaching the nano membrane to an anodic aluminum oxide (AAO) mold. A size of a scale bar is 500 nm.

Figure 13:
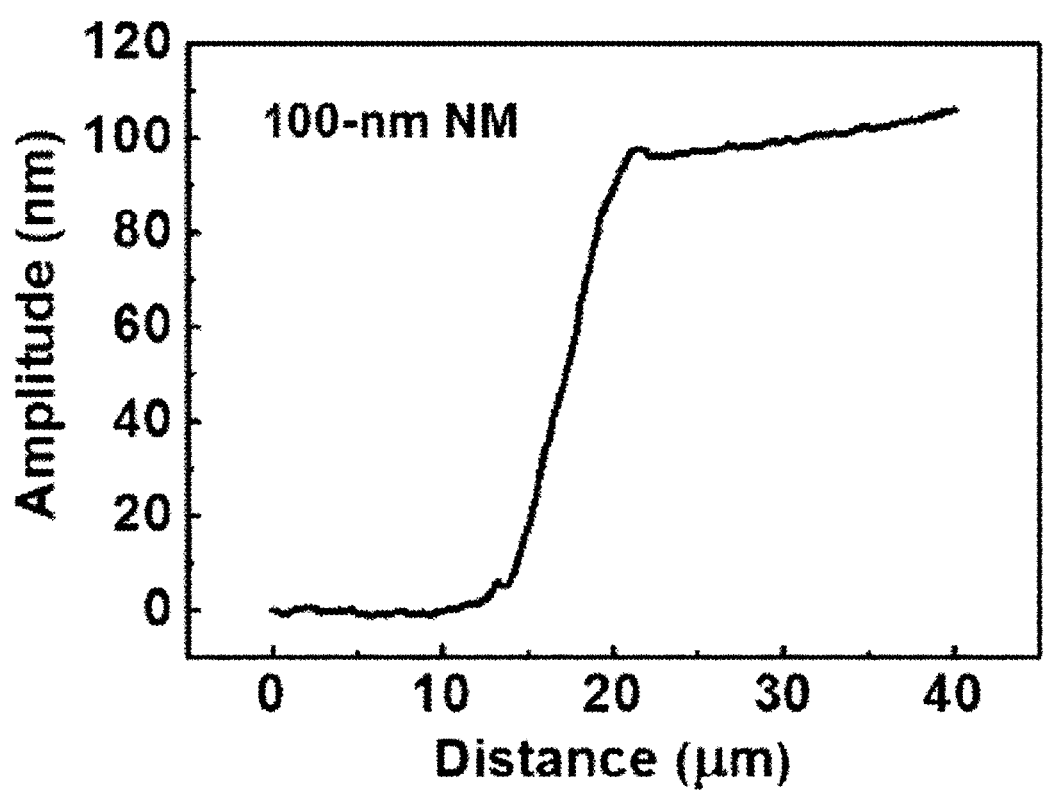
FIG. 13 is a graph showing a thickness of the nano membrane according to one embodiment of the present invention.

FIG. 13 is a graph showing a thickness of the nano membrane according to one embodiment of the present invention.

Referring to FIG. 13, a thickness of the nano membrane was measured to be about 100 nm using an atomic force microscopy.

Since the nano membrane according to one embodiment of the present invention has a thin thickness of about 100 nm, the nano membrane has strong bendability such that there is an advantage in that an adhesion force to a human body, a curved surface, and the like is excellent.

Further, owing to the thin thickness of the nano membrane, the speaker and the microphone, which use the nano membrane, may also have excellent adhesion forces to the human body such that there is an advantage in that the speaker and the microphone are capable of being applied to a wearable device.

Figure 14:
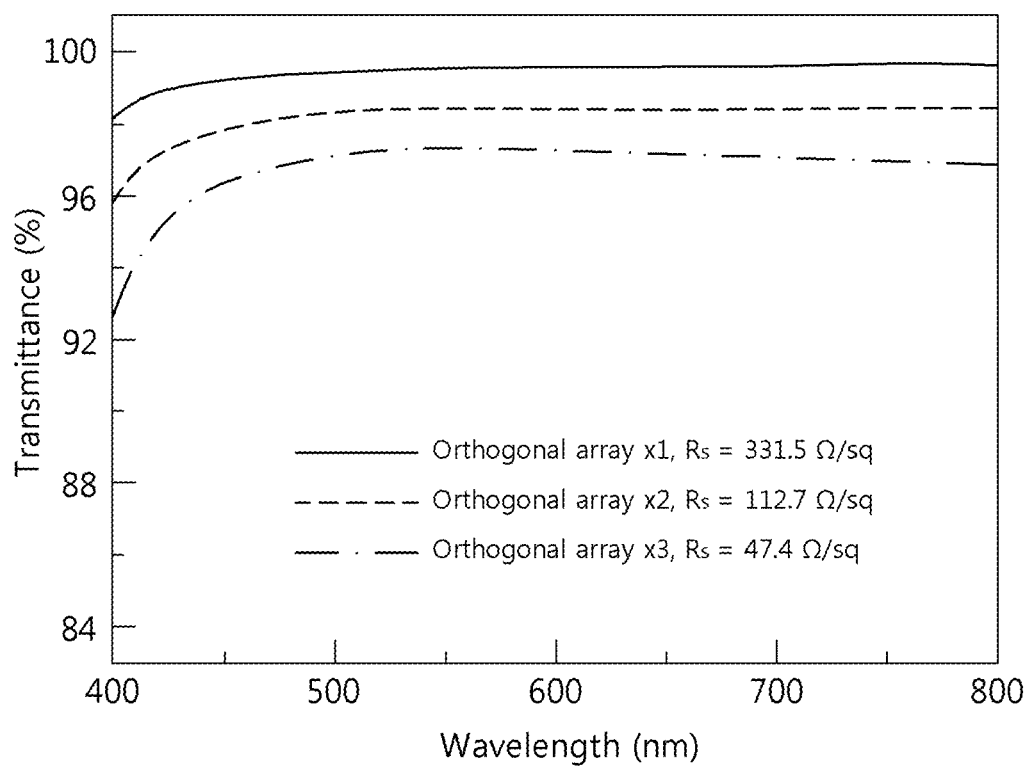
FIG. 14 is a graph showing a comparison of transmittances according to the number of coating times of a silver nanowire in the nano membrane according to one embodiment of the present invention.

FIG. 14 is a graph showing a comparison of transmittances according to the number of coating times of a silver nanowire in the nano membrane according to one embodiment of the present invention.

Referring to FIG. 14, it can be seen that, as the number of coating times of the silver nanowires increases (the number of orthogonal arrays increases) in a wavelength range of 400 nm to 800 nm, transmittance decreases.

Figure 15:
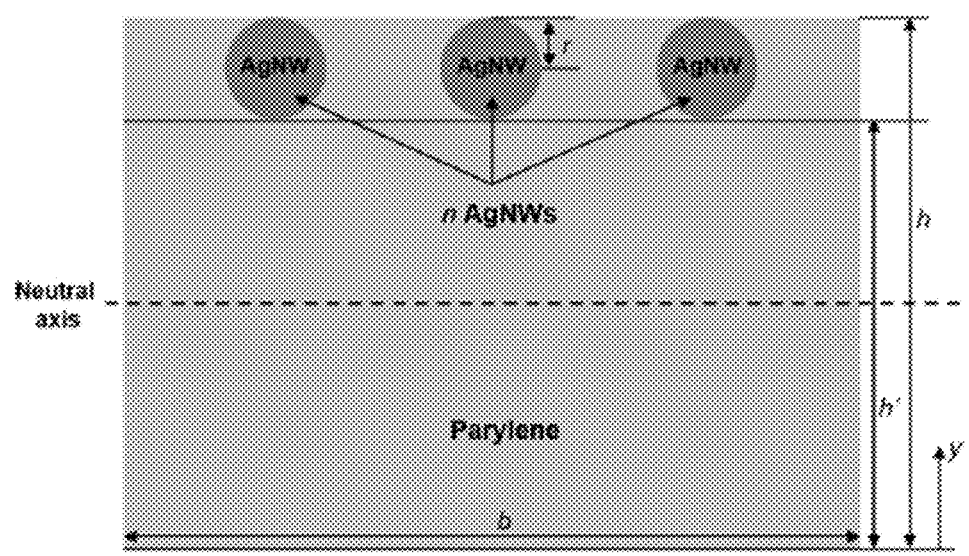
FIG. 15 is a schematic cross-sectional view of the nano membrane according to one embodiment of the present invention.

FIG. 15 is a schematic cross-sectional view of the nano membrane according to one embodiment of the present invention.

Referring to FIG. 15, n silver nanowires of which has a radius r and a Young's modulus of 83 GPa are included in a parylene thin film having a size of b×h and a Young's modulus of 3.2 GPa.

A distance $y_0$ between a neutral axis and a bottom of the parylene thin film is calculated according to the following Equation 3.

$$y_0 = \frac{h}{2} * \frac{1 + \frac{2h+2r}{h}\left(\frac{E_{Ag}}{E_{Pa}} - 1\right)n\pi r^2 / bh}{1 + \left(\frac{E_{Ag}}{E_{Pa}} - 1\right)n\pi r^2 / bh}$$ [Equation 3]

Here, $y_0$ is the distance between the neutral axis and the bottom of the parylene thin film, h is a thickness of the parylene thin film, h' is a distance between the silver nanowires and the bottom of the parylene thin film, r is a radius of each of the silver nanowires, b is a width of the parylene thin film, and $E_{Ag}$ and $E_{Pa}$ are Young's moduli of the silver nanowire and the parylene thin film, respectively.

On the basis of $y_0$ calculated according to Equation 3, bending stiffness of the nano membrane may be calculated using the following Equation 4.

$$EI = E_{Pa}bh(1/3h^2 - hy_0 + y_0^2) + (E_{Ag} - E_{pa})n\pi r^2[4/3r^2 + 2r(h'-y_0) + (h'-y_0)^2] \quad \text{[Equation 4]}$$

Here, $y_0$ is the distance between the neutral axis and the bottom of the parylene thin film, h is a thickness of the parylene thin film, h' is a distance between the silver nanowires and the bottom of the parylene thin film, r is a radius of each of the silver nanowires, b is a width of the parylene thin film, and $E_{Ag}$ and $E_{Pa}$ are Young's moduli of the silver nanowire and the parylene thin film, respectively.

Aside from Equation 4, on the basis of $y_0$ calculated according to Equation 3, the bending stiffness of the nano membrane may also be calculated even using the following Equation 5.

$$EI = E_{Hybrid}bh(1/3h^2 - hy_0 + y_0^2) \quad \text{[Equation 5]}$$

Here, $E_{Hybrid}$ is a Young's modulus of a nano membrane containing orthogonally-arranged silver nanowires and was experimentally calculated through the capillary wrinkle test of FIG. 3A.

Figure 16:
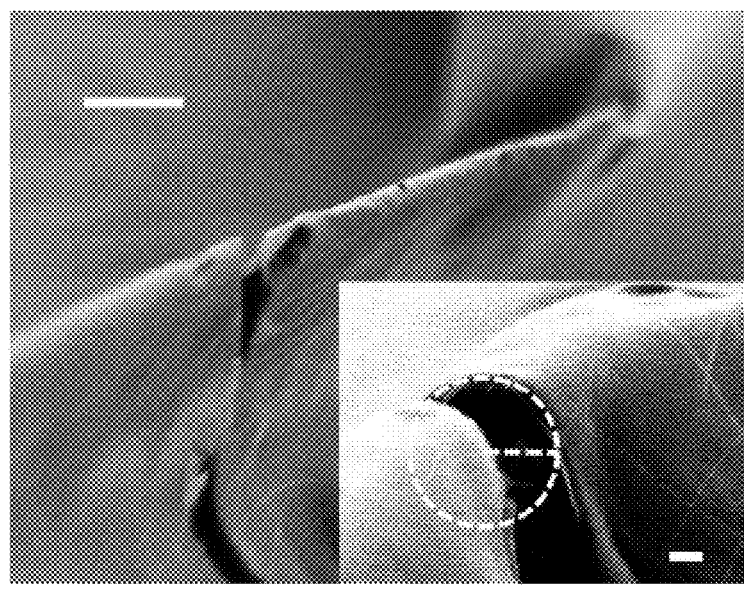
FIG. 16 is a scanning electron microscope (SEM) image of the nano membrane according to one embodiment of the present invention, which is captured after the nano membrane is folded in half.

FIG. 16 is an SEM image of the nano membrane according to one embodiment of the present invention, which is captured after the nano membrane is folded in half.

Referring to FIG. 16, the nano membrane folded in half has a bending radius of 2.2 μm or less. A size of a scale bar on an upper left side in FIG. 16 is 5 μm, and a size of a scale bar included in an inset is 1 μm.

Figure 17:
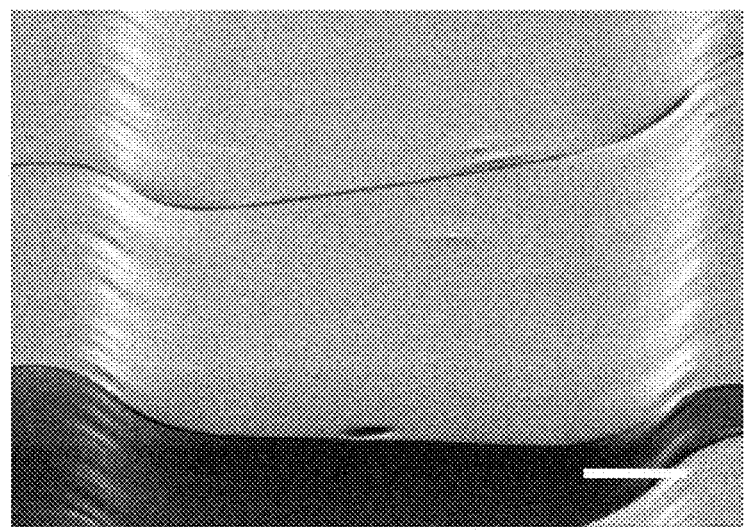
FIG. 17 is a SEM image of the nano membrane according to one embodiment of the present invention, which is captured after the nano membrane is attached to polydimethylsiloxane (PDMS).

FIG. 17 is a SEM image of the nano membrane according to one embodiment of the present invention, which is captured after the nano membrane is attached to PDMS.

Referring to FIG. 17, the nano membrane was closely adhered along an edge of a line pattern of a surface of PDMS having a width of 20 μm. A size of a scale bar is 10 μm.

FIGS. 18A to 18F are diagrams showing a step surface coverage of a pyramid pattern arranged on a surface of PDMS according to the thickness of the nano membrane in the microphone using the nano membrane according to one embodiment of the present invention.

Figure 18A:
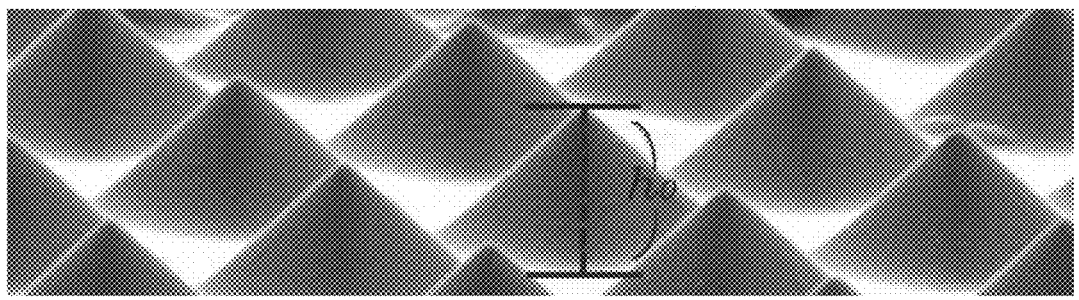
FIGS. 18A to 18F are diagrams showing a step surface coverage of a pyramid pattern arranged on a surface of PDMS according to the thickness of the nano membrane in the microphone using the nano membrane according to one embodiment of the present invention.
Figure 18B:
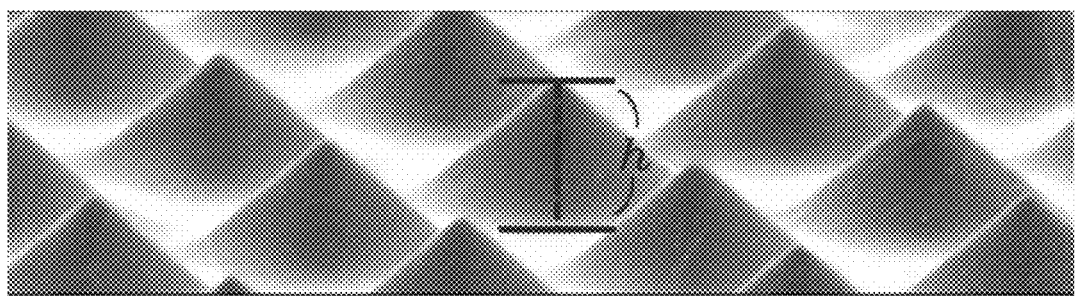
Figure 18C:
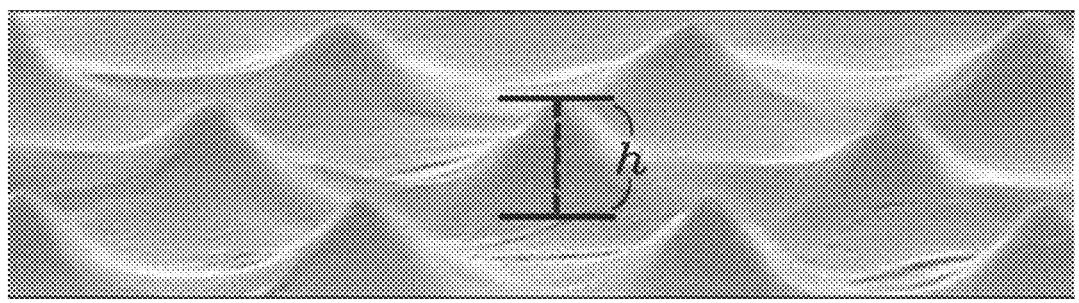
Figure 18D:
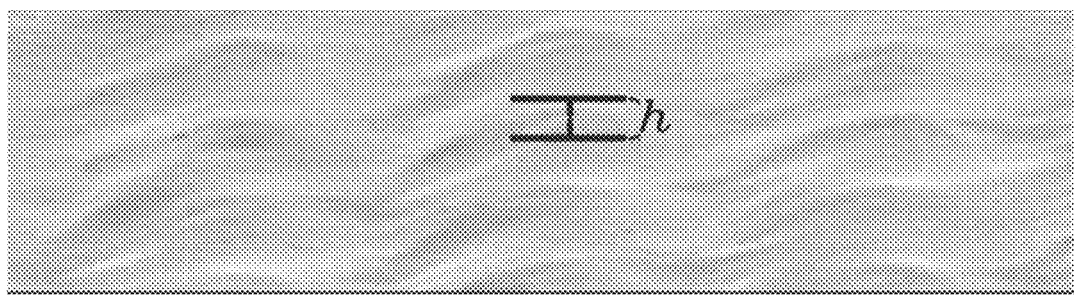

FIG. 18A is a pyramidal pattern of PDMS to which the nano membrane is not attached, and FIGS. 18B to 18D are pyramidal patterns of PDMS to which nano membranes having thicknesses of 40 nm, 100 nm, and 200 nm, respectively, are attached.

Figure 18E:
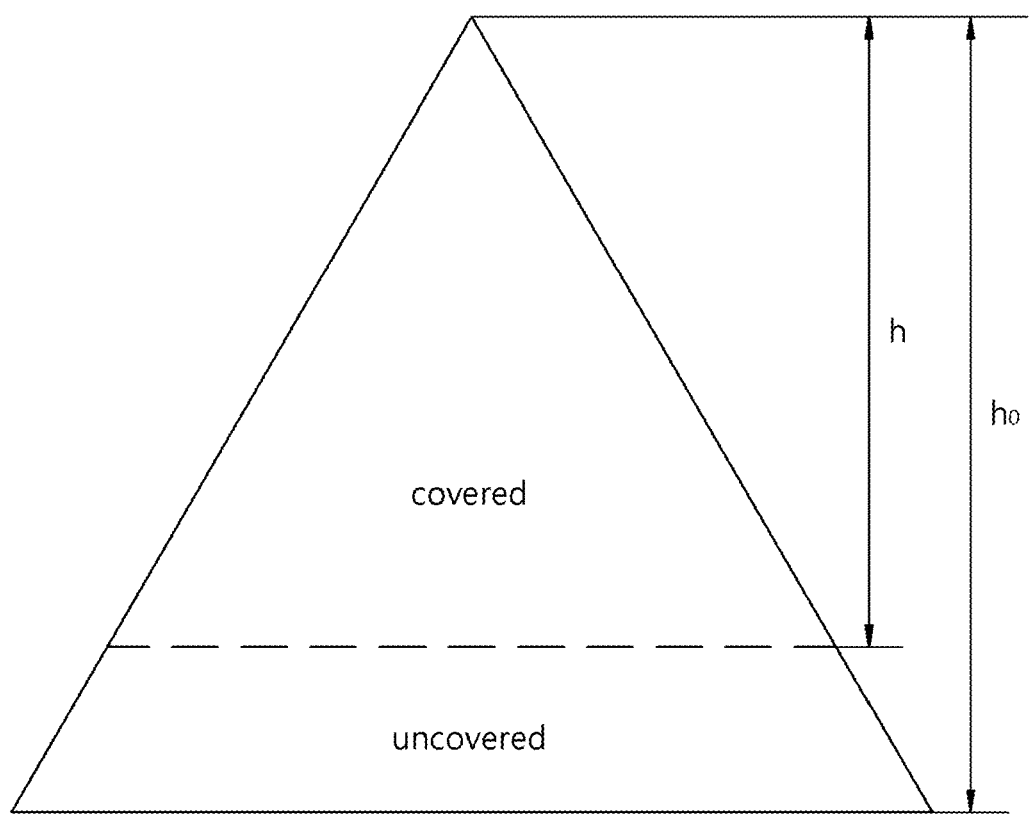

FIG. 18E is a conceptual diagram for calculating a step surface coverage of the pyramid pattern arranged on the surface of PDMS.

Referring to FIG. 18E, the step surface coverage of the pyramid pattern may be calculated as $h/h_0 *100$. Here, h is a height covered by the nano membrane, and $h_0$ is a height of the pyramid pattern when the nano membrane is not attached.

Figure 18F:
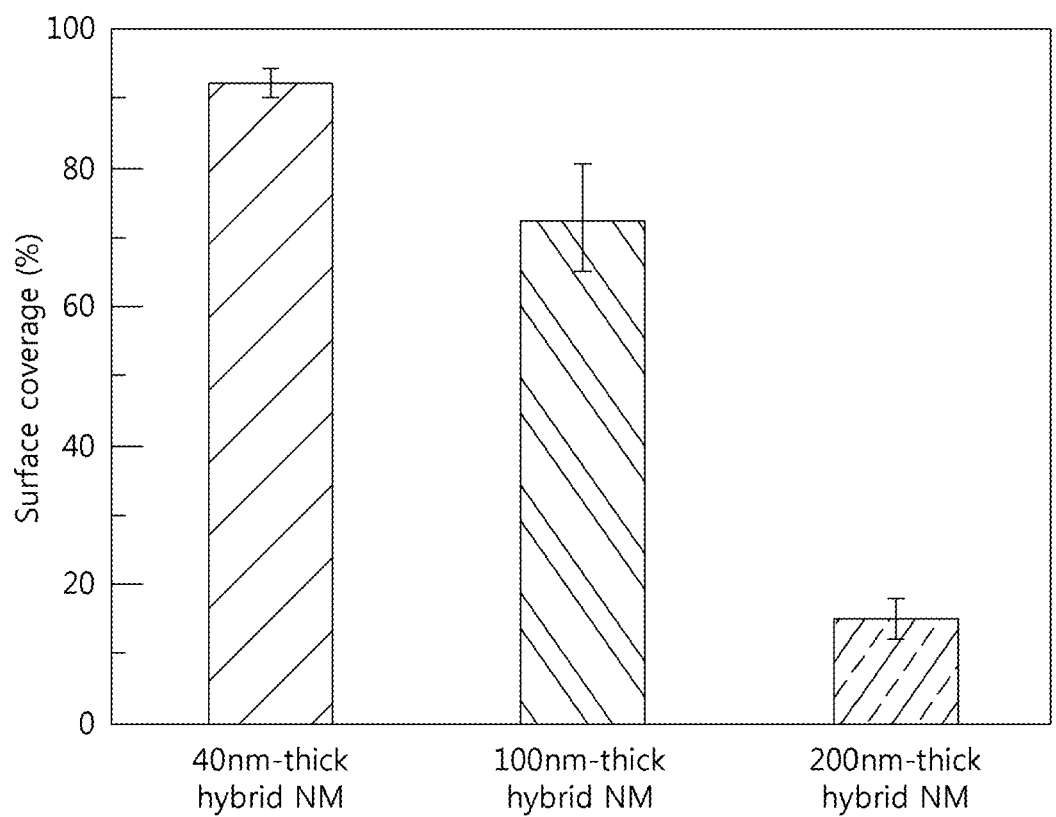

FIG. 18F is a graph showing a calculated step surface coverage of the pyramid pattern arranged on the surface of PDMS per thickness of the nano membrane.

Referring to FIG. 18F, the step surface coverage of the pyramid pattern arranged on the surface of PDMS was measured to be higher as the thickness of the nano membrane becomes thinner.

That is, it was experimentally confirmed that, as the thickness of the nano membrane becomes thinner, adhesion forces of the nano membrane according to one embodiment of the present invention, the speaker using the nano membrane, and the microphone using the nano membrane were improved to a 3D surface such that the nano membrane, the speaker using the nano membrane, and the microphone using the nano membrane may be well attached to a human body or a curved surface.

Figure 19:
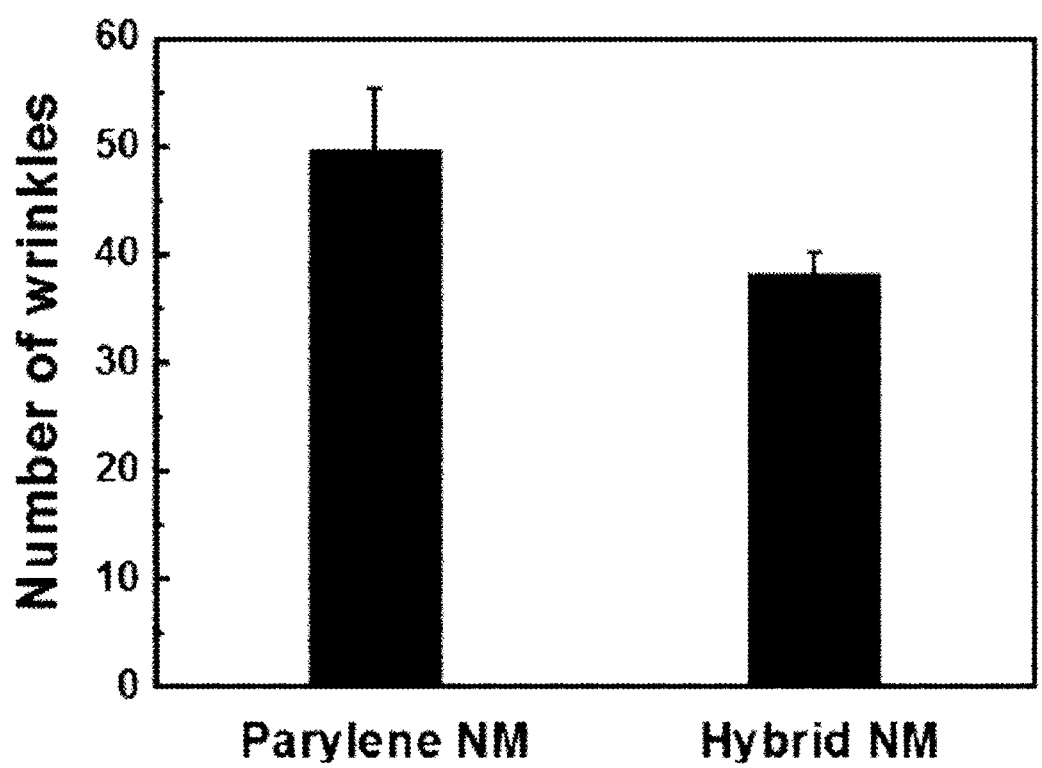
FIG. 19 shows a comparison result of a capillary wrinkle test for the nano membrane according to one embodiment of the present invention and a nano membrane made of only parylene.

FIG. 19 shows a comparison result of a capillary wrinkle test for the nano membrane according to one embodiment of the present invention and a nano membrane made of only parylene.

Referring to FIG. 19, as a result of the capillary wrinkle test, since the nano membrane according to one embodiment of the present invention includes the orthogonally-arranged silver nanowires, the number of capillary wrinkles was exhibited to be smaller than that of the nano membrane made of only parylene.

Since the silver nanowires are included, the Young's modulus of the nano membrane was increased, and additionally, referring to FIG. 3A, it can be seen that, since the number of capillary wrinkles is decreased as the density of the silver nanowires increases, the Young's modulus increases.

FIGS. 20A to 20D are graphs showing a result of a hysteresis indentation load test (loading-unloading indentation test) for the nano membrane according to one embodiment of the present invention and a nano membrane made of only a polymer.

Figure 20A:
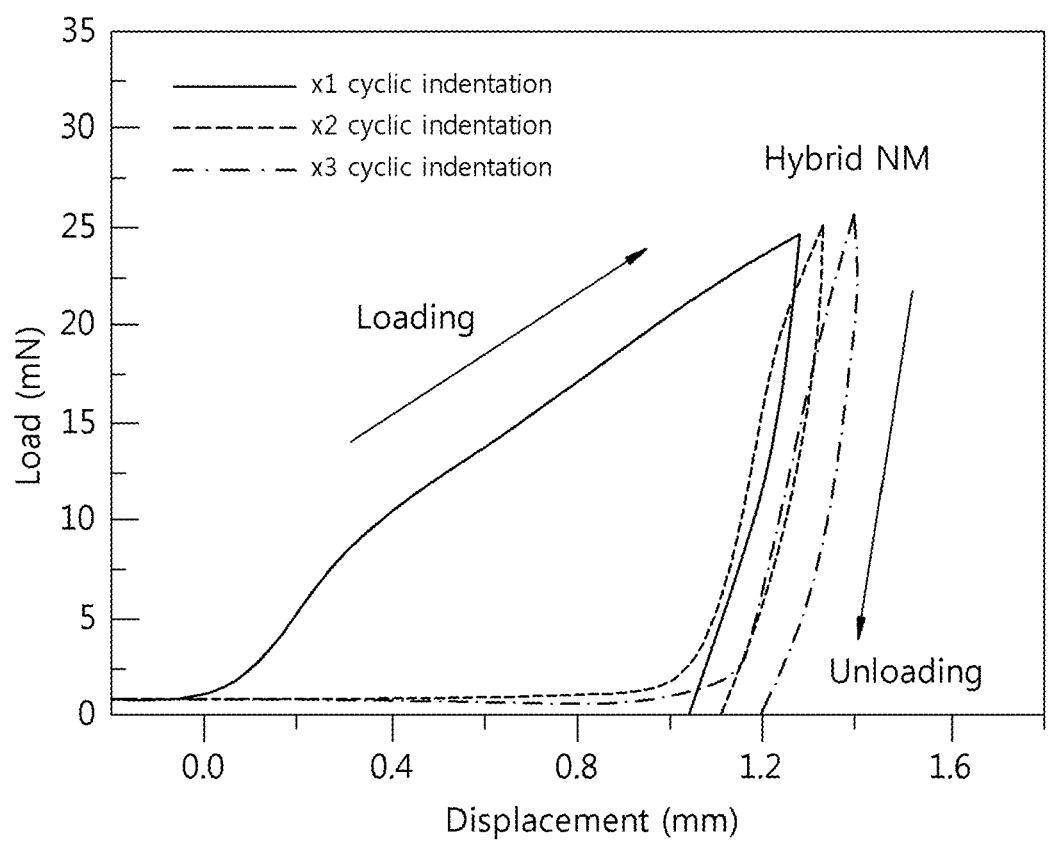
FIGS. 20A to 20D are graphs showing a result of a hysteresis indentation load test (loading-unloading indentation test) for the nano membrane according to one embodiment of the present invention and a nano membrane made of only a polymer.
Figure 20B:
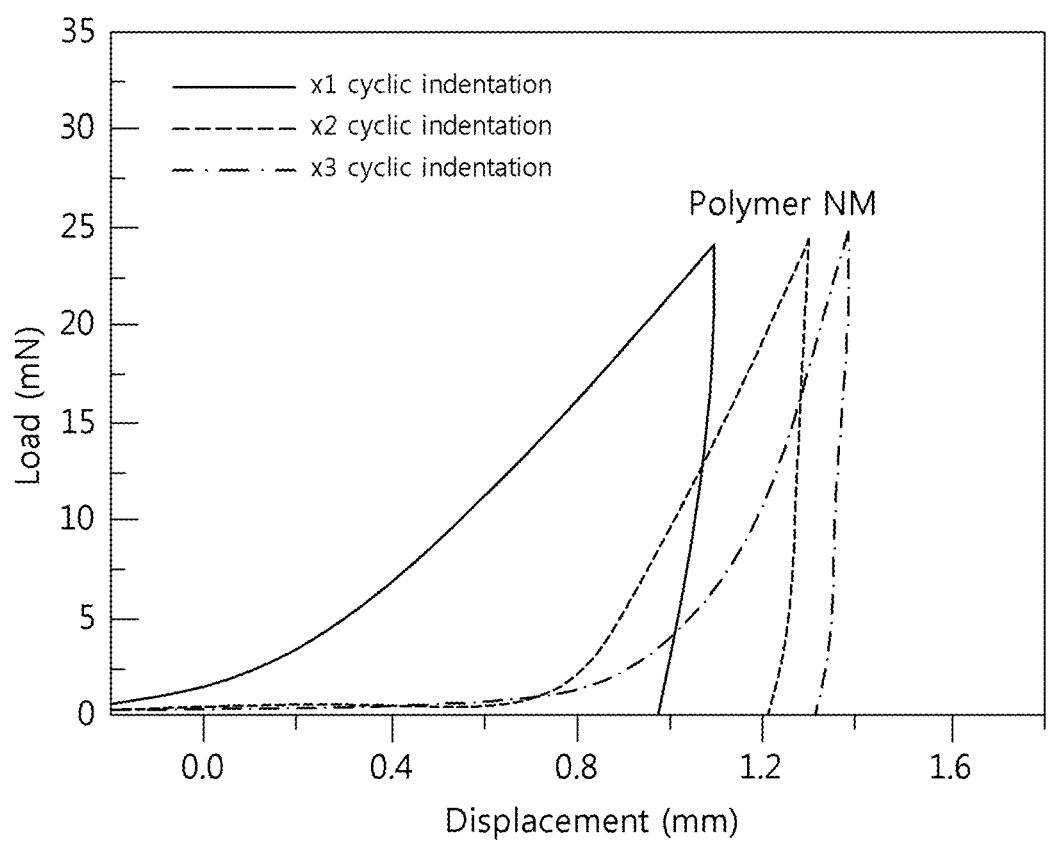

FIGS. 20A and 20B are hysteresis indentation load test results of the nano membrane (Hybrid NM) according to one embodiment of the present invention and a nano membrane (Polymer NM) made of only a polymer when an indentation load is 27 mN or less.

Referring to FIGS. 20A and 20B, when an indentation load is repeatedly applied, measured hysteresis curves of the nano membrane (Polymer NM) made of only a polymer exhibited a similar tendency.

On the other hand, when the indentation load is first applied, the nano membrane (Hybrid NM) according to one embodiment of the present invention exhibited a hysteresis curve having a wider range than the nano membrane (Polymer NM) made of only a polymer, while tendency of the hysteresis curve exhibited a significant change when the indentation load is repeatedly applied.

Figure 20C:
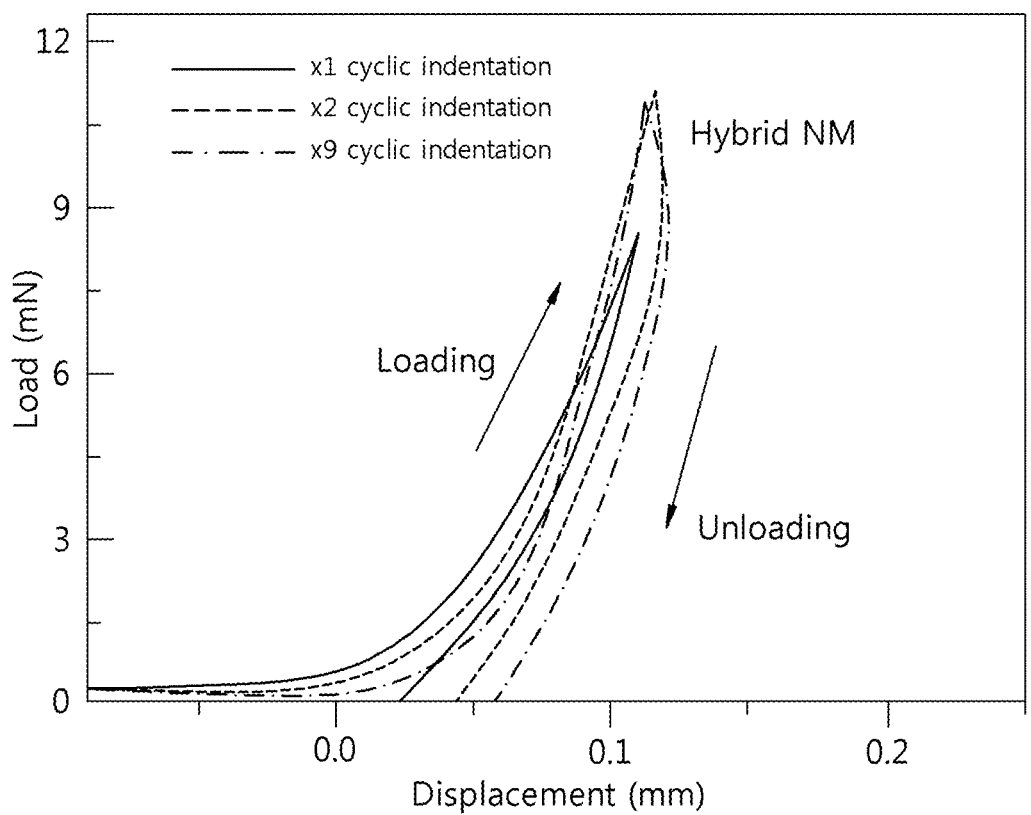
Figure 20D:
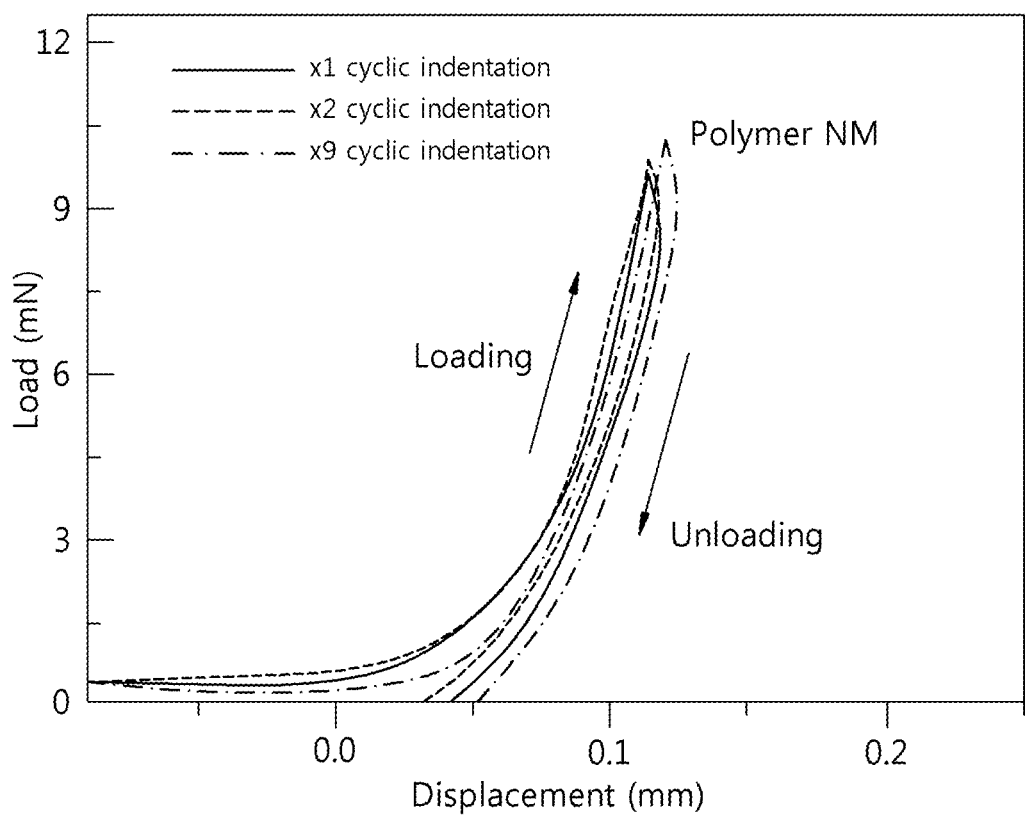

FIGS. 20C and 20D are hysteresis indentation load test results of the nano membrane (Hybrid NM) according to one embodiment of the present invention and the nano membrane (Polymer NM) made of only a polymer when an indentation load is 11 mN or less.

Referring to FIGS. 20C and 20D, when the indentation load is 11 mN or less, the nano membrane (Hybrid NM) according to one embodiment of the present invention and the nano membrane (Polymer NM) made of only a polymer were measured to exhibit a similar tendency.

Figure 21A:
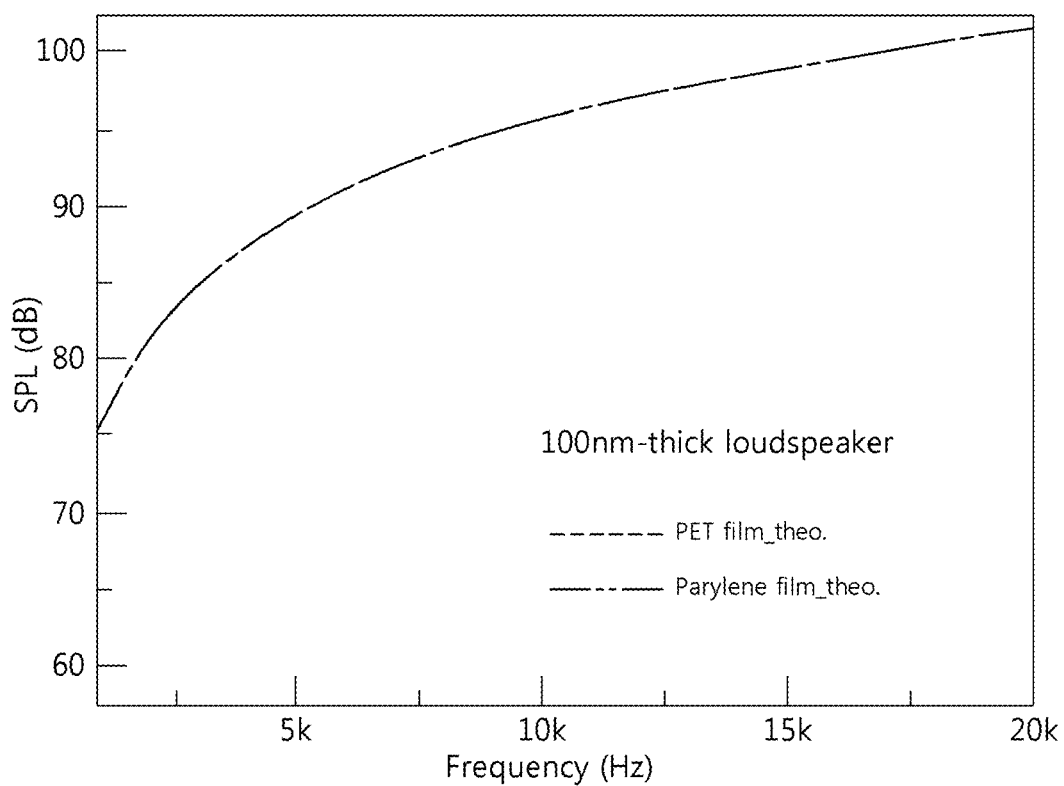
FIGS. 21A and 21B are graphs showing a theoretical comparison of SPLs for the speaker using the nano membrane according to one embodiment of the present invention and a speaker including a PET substrate having a general thickness.
Figure 21B:
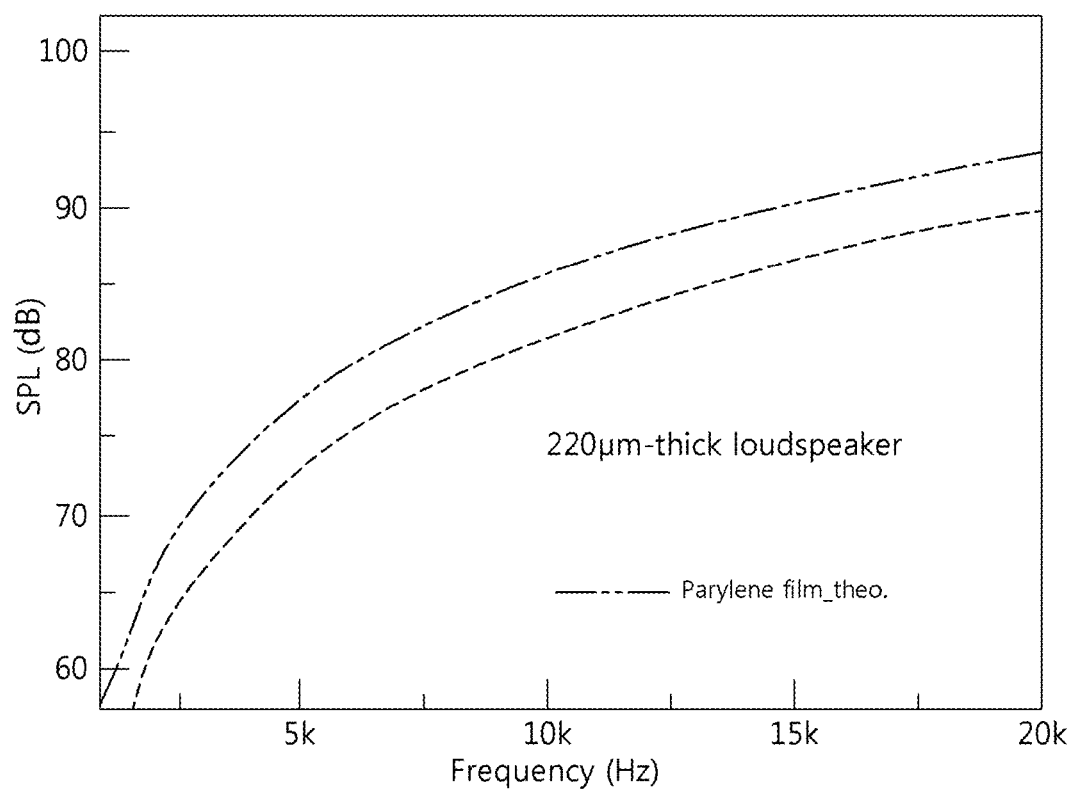

FIGS. 21A and 21B are graphs showing a theoretical comparison of SPLs for the speaker using the nano membrane according to one embodiment of the present invention and a speaker including a PET substrate having a general thickness.

Referring to 21A, when a thickness of a speaker (Parylene film_theo.) using the nano membrane according to one embodiment of the present invention and a thickness of a speaker (PET film_theo.) including a PET substrate each are 100 nm, SPLs for each frequency are the same.

Referring to FIG. 21B, when the thickness of the speaker (Parylene film_theo.) using the nano membrane according to one embodiment of the present invention and the thickness of the speaker (PET film_theo.) including the PET substrate each are 220 μm, the SPL of the speaker (Parylene film_theo.) using the nano membrane according to one embodiment of the present invention was measured to be high.

That is, it was experimentally confirmed that sound emission performance of the speaker (Parylene film_theo.) using the nano membrane according to one embodiment of the present invention was superior to that of the speaker (PET film_theo.) including the PET substrate.

Figure 22A:
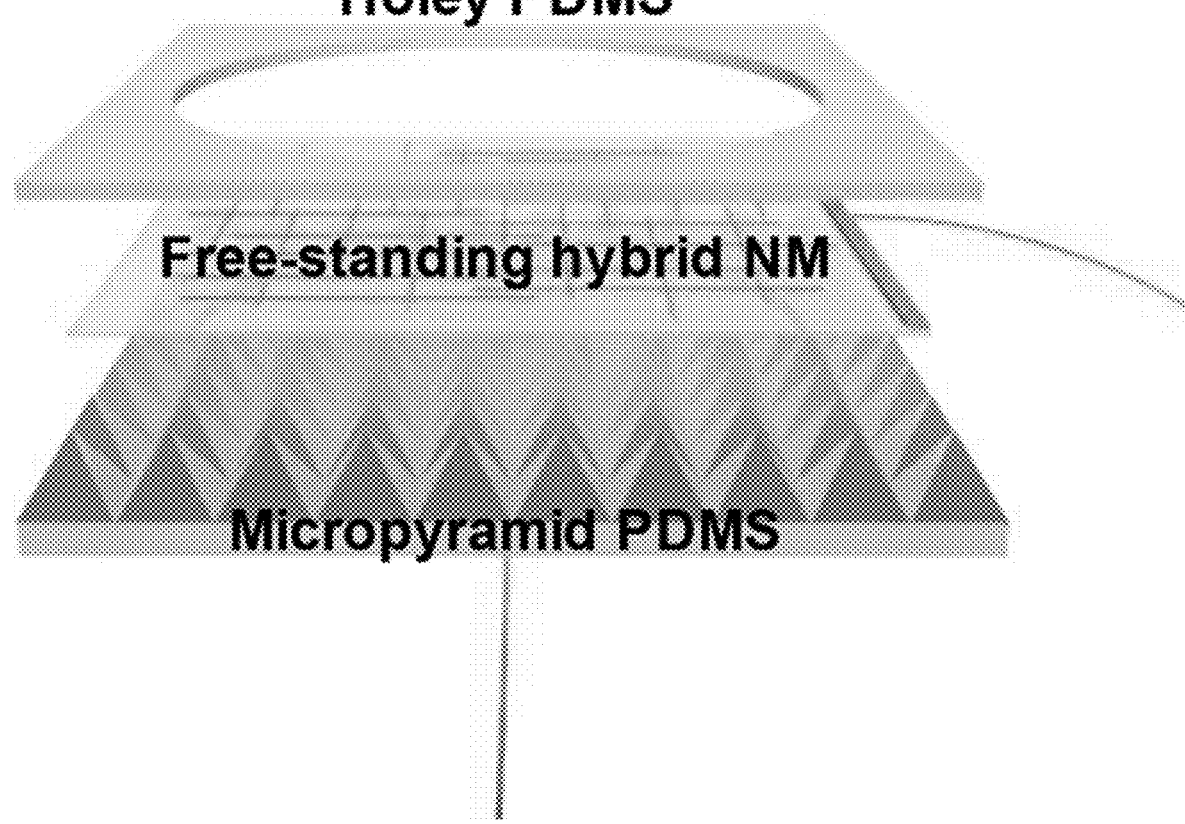
FIGS. 22A and 22B are diagrams illustrating a comparison of the microphone using the nano membrane according to one embodiment of the present invention and a microphone including a planar polymer film.
Figure 22B:
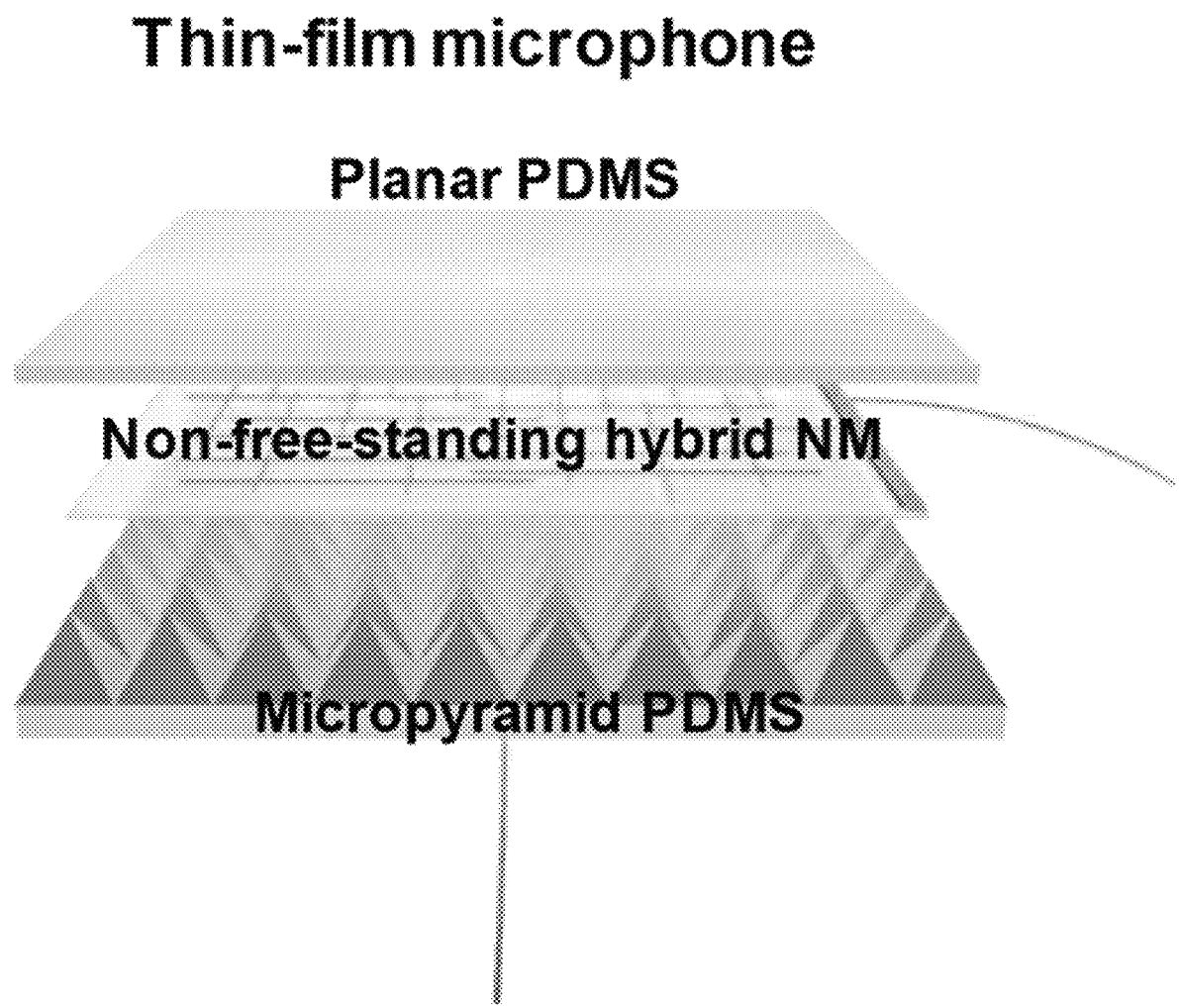

FIGS. 22A and 22B are diagrams illustrating a comparison of the microphone using the nano membrane according to one embodiment of the present invention and a microphone including a planar polymer film.

FIG. 22A shows the microphone (NM microphone) using the nano membrane according to one embodiment of the present invention, and FIG. 22B shows a microphone (Thin-film microphone) including a planar polymer film.

In the microphone (NM microphone) using the nano membrane according to one embodiment of the present invention, when a sound pressure is applied, the nano membrane vibrates between the first and second polymer films, triboelectricity is generated by the vibration, and an output voltage and a frequency of the generated triboelectricity are measured.

When a central hole of the first polymer film is open as shown in FIG. 22A, the nano membrane vibrates smoothly because of a sufficient space, whereas when the first polymer film is planar as shown in FIG. 22B, the nano membrane is bonded to the polymer film and does not vibrate such that performance of the microphone may be degraded.

Figure 23A:
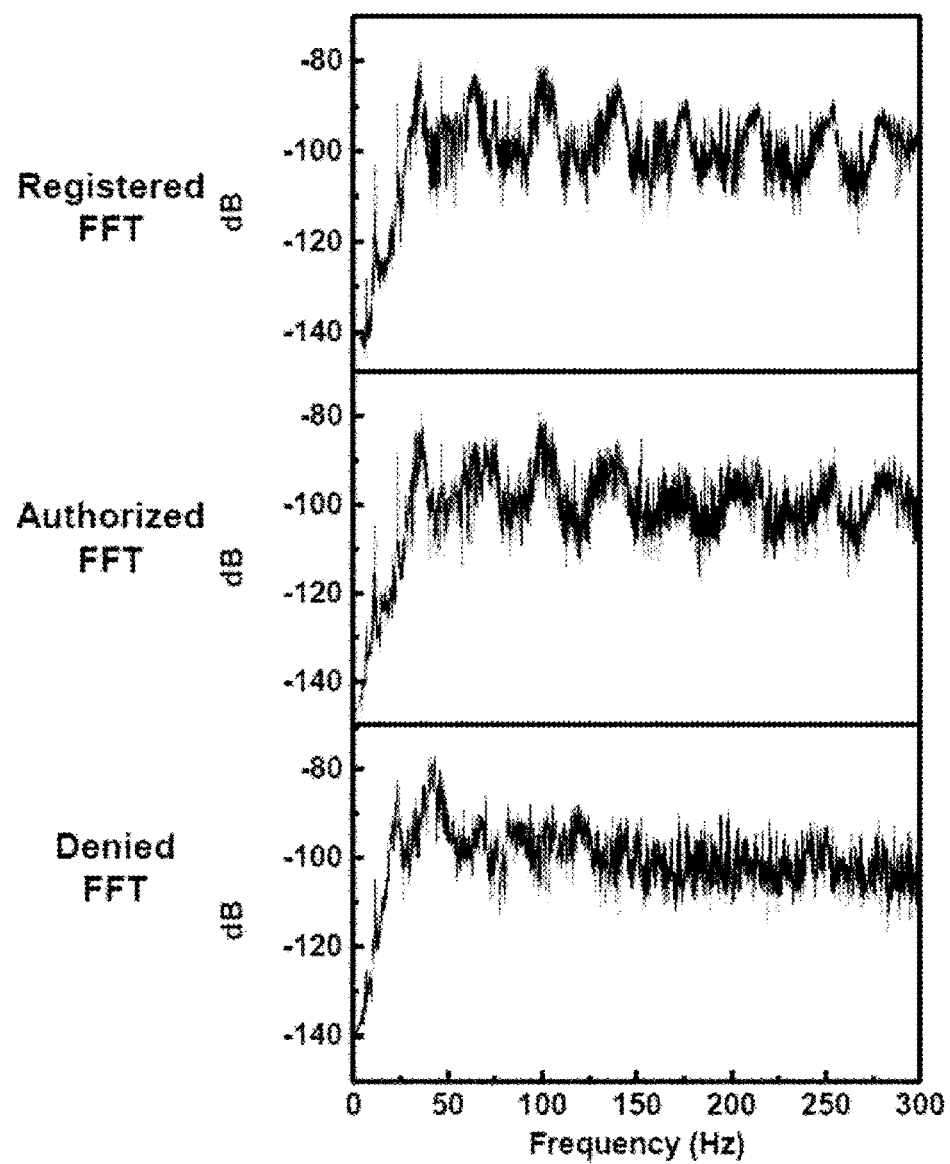
FIGS. 23A to 23C show a result for which the microphone using the nano membrane according to one embodiment of the present invention is employed in a voice pattern security system.
Figure 23B:
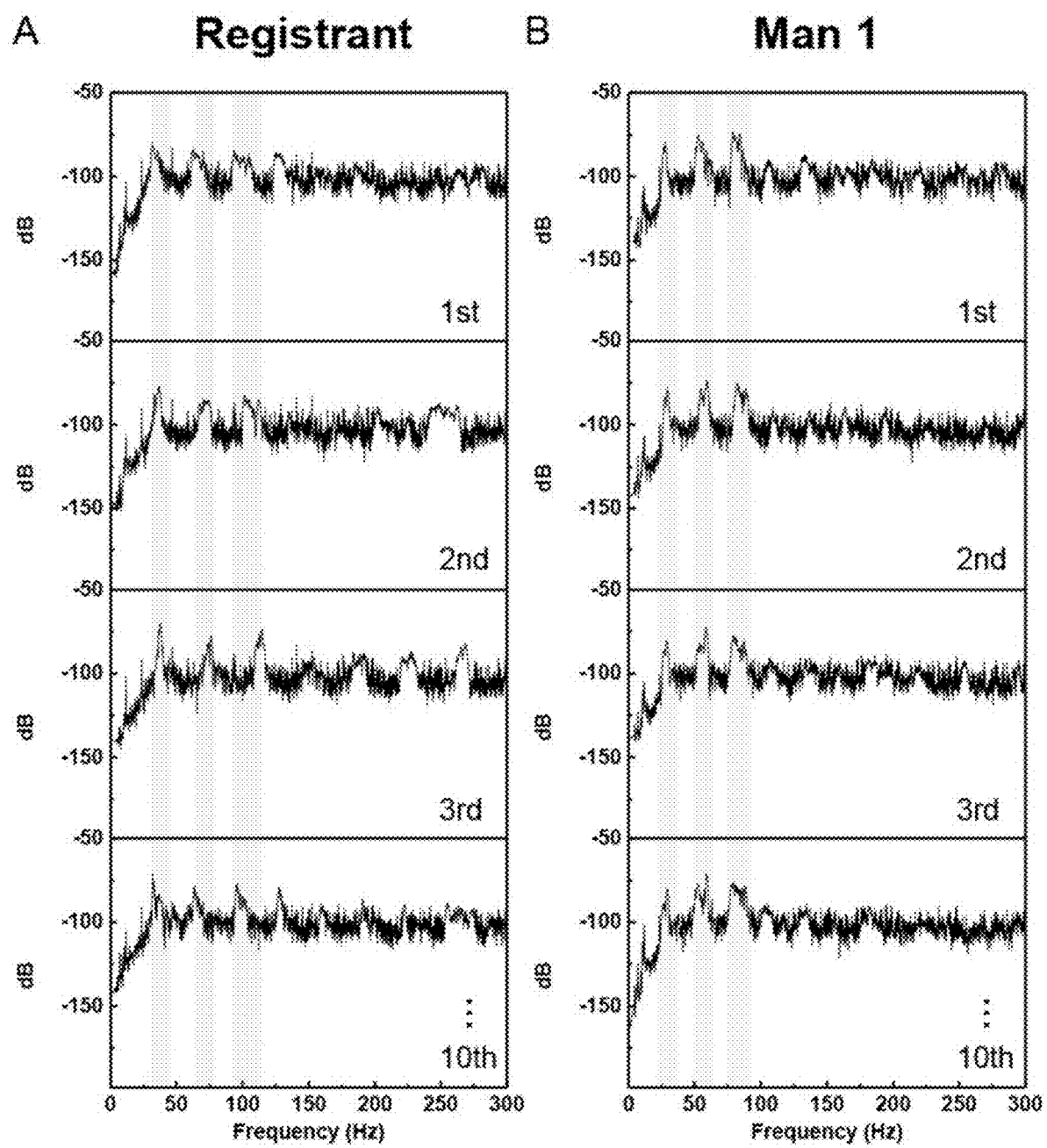

FIGS. 23A and 23B show a result for which the microphone using the nano membrane according to one embodiment of the present invention is employed in a voice pattern security system.

The voice pattern security system is a program for registering a voice waveform of a user using the microphone using the nano membrane, analyzing the voice waveform and a frequency pattern, allowing access of only a user whose voice is similar to the registered voice waveform and frequency pattern.

FIG. 23A is a graph showing a decibel (dB) for each frequency measured at the microphone using the nano membrane according to one embodiment of the present invention when a registrant, an authorized user, and a denied user speak a word "nano membrane."

FFT was performed on a waveform of a sound input from each of the registrant, the authorized user, and the denied user.

Figure 23C:
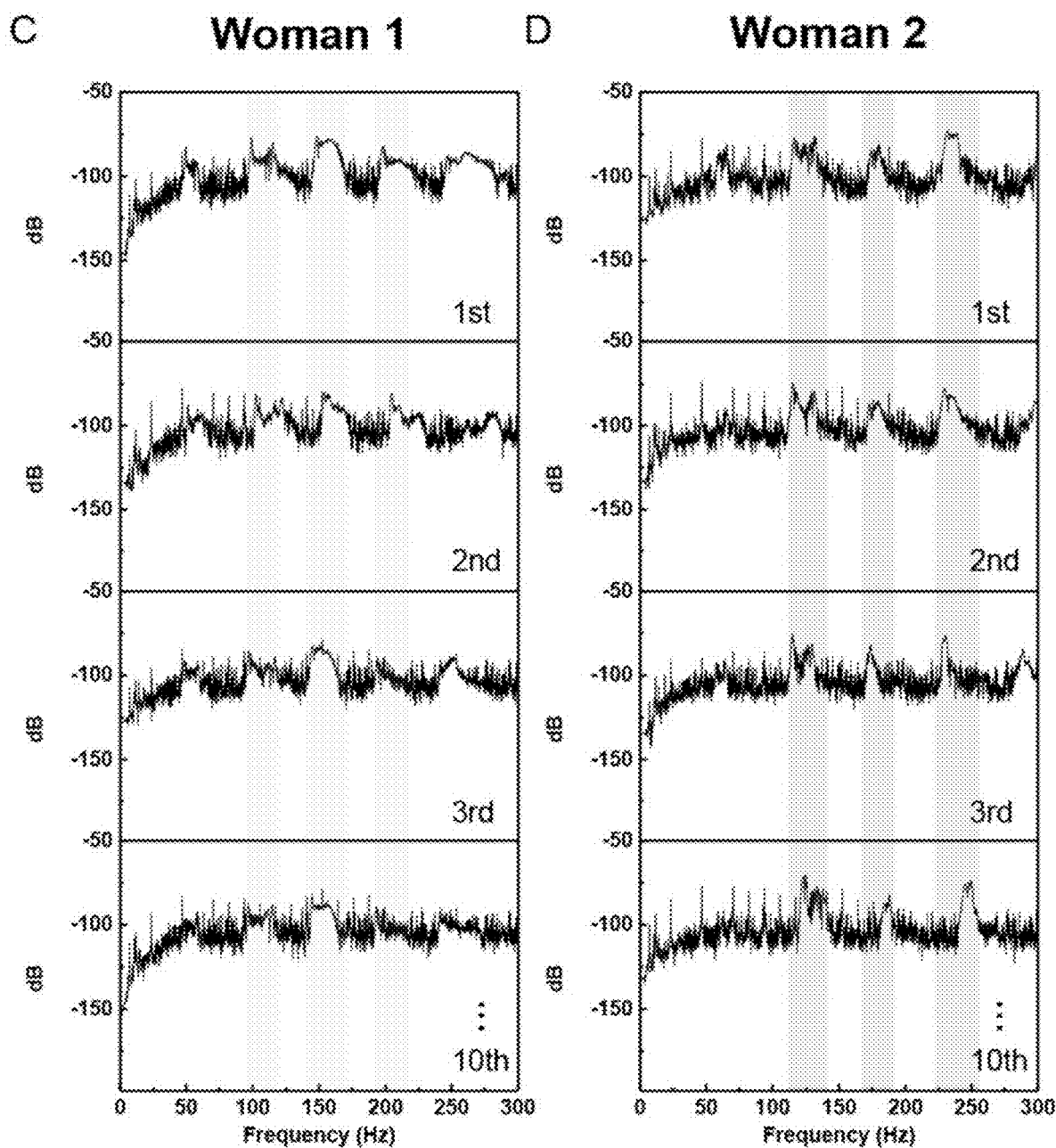

FIGS. 23B and 23C are graphs showing a dB for each frequency measured at the microphone using the nano membrane according to one embodiment of the present invention when a registrant, one male person, and two female persons speak a word "hello."

Referring to FIGS. 23B and 23C, FFT was repeated ten times on a waveform of a sound extracted from each of four persons, i.e., the registrant, one male person, and two female persons.

A measured dB peak for each frequency was differently measured for each person, and thus performance of voice measurement and classification of the microphone using the nano membrane according to one embodiment of the present invention was experimentally confirmed.

Figure 24:
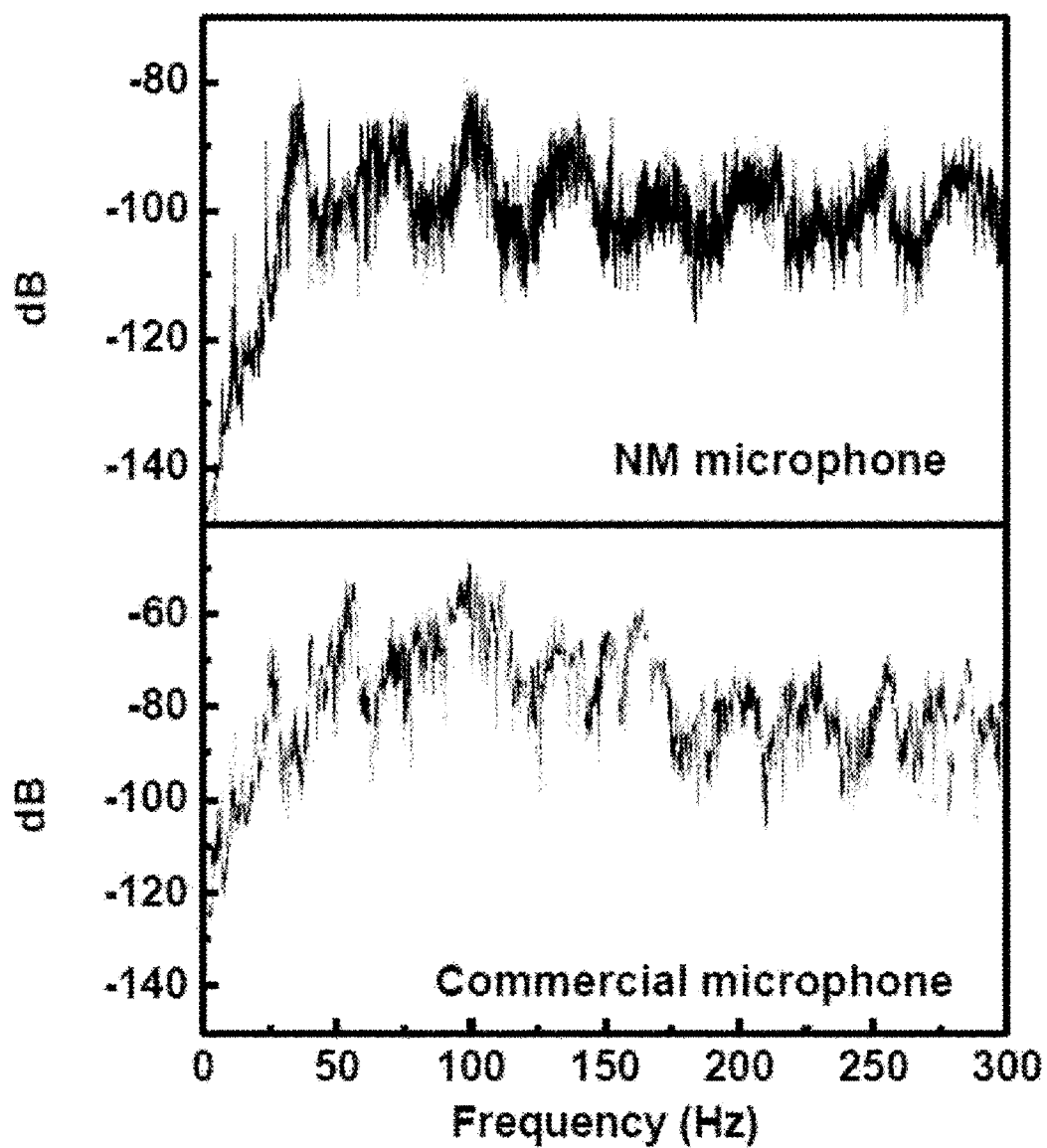
FIG. 24 is a graph showing a result of a comparison test for the microphone using the nano membrane according to one embodiment of the present invention and a commercial microphone.

FIG. 24 is a graph showing a result of a comparison test for the microphone using the nano membrane according to one embodiment of the present invention and a commercial microphone.

Referring to FIG. 24, after a registrant speaks a word, voices recorded in the microphone (NM microphone) using the nano membrane according to one embodiment of the present invention and in a commercially available microphone (Commercial microphone: 40 PH G.R.A.S.) were analyzed.

FFT was performed on the voices recorded in the microphone (NM microphone) using the nano membrane according to one embodiment of the present invention and in the commercially available microphone and dBs for frequencies were compared, and the comparison results of the dB s were measured to be very similar.

Since a nano membrane according to one embodiment of the present invention is transparent and has a thickness of a nano unit, there is an advantage capable of being easily attached to a 3D surface such as a human body.

A speaker and a microphone, which use the nano membrane according to one embodiment of the present invention, are transparent and can be attached to the human body such that there is an advantage capable of being utilized in a wearable device.

Although the description herein has been made in some illustrative aspects, various modifications and alterations can be made from the scope defined by the appended claims, and the technical scope of the present invention should be defined by the appended claims.

What is claimed is:

1. A microphone device using a nano membrane, comprising:
   a nano membrane including metal nanowires, wherein the nano membrane comprises:
      an insulating layer having a predetermined thickness based on a diameter of each of metal nanowires and configured to contain the metal nanowires therein; and
      the metal nanowires arranged to cross and having portions of side surfaces which protrude from one surface of the insulating layer;
   a first polymer film bonded to an upper surface of the nano membrane; and
   a second polymer film bonded to a lower surface of the nano membrane.

2. The nano membrane of claim 1, wherein the metal nanowires are arranged such that the metal nanowires, of which a length direction is arranged in a second direction perpendicular to a first direction, are superimposed on the metal nanowires of which a length direction is arranged in the first direction.

3. The nano membrane of claim 2, wherein the metal nanowires are connected in a network structure.

4. The microphone device of claim 1, wherein the first polymer film has a flat shape and includes a hole passing through a flat surface thereof.

5. The microphone device of claim 1, wherein:
   the second polymer film includes a plurality of horns regularly arranged on a surface of the second polymer film; and
   vertexes of the horns are in contact with the lower surface of the nano membrane.

6. The microphone device of claim 1, wherein:
   the second polymer film includes a plurality of microdomes regularly arranged on a surface of the second polymer film; and
   the plurality of microdomes are in contact with the lower surface of the nano membrane.

7. The microphone device of claim 1, wherein:
   the second polymer film includes a plurality of micropillars regularly arranged on a surface of the second polymer film; and the plurality of micropillars are in contact with the lower surface of the nano membrane.

8. The microphone device of claim 1, further comprising a measuring portion configured to measure an output voltage of triboelectricity and a frequency thereof, which are generated by vibration of the nano membrane when a sound pressure is applied to the microphone device.

* * * * *